(12) United States Patent
Tamblyn et al.

(10) Patent No.: US 9,866,693 B2
(45) Date of Patent: Jan. 9, 2018

(54) SYSTEM AND METHOD FOR MONITORING PROGRESS OF AUTOMATED CHAT CONVERSATIONS

(71) Applicant: Genesys Telecommunications Laboratories, Inc., Daly City, CA (US)

(72) Inventors: Eric Tamblyn, Murphy, TX (US); Herbert Willi Artur Ristock, Walnut Creek, CA (US); Arnaud LeJeune, Chicago, IL (US); Richard McCrossan, Daly City, CA (US); Paul Segre, Sonoma, CA (US); Steve O'Donoghue, San Francisco, CA (US)

(73) Assignee: GENESYS TELECOMMUNICATIONS LABORATORIES, INC., Daly City, CA (US)

( * ) Notice: Subject to any disclaimer, the term of this patent is extended or adjusted under 35 U.S.C. 154(b) by 0 days.

(21) Appl. No.: 15/149,071

(22) Filed: May 6, 2016

(65) Prior Publication Data

US 2017/0324868 A1 Nov. 9, 2017

(51) Int. Cl.
*H04M 3/00* (2006.01)
*H04M 5/00* (2006.01)
(Continued)

(52) U.S. Cl.
CPC .... *H04M 3/5191* (2013.01); *G06Q 10/06316* (2013.01); *G06Q 30/016* (2013.01);
(Continued)

(58) Field of Classification Search
CPC .. G10L 15/00; G06Q 10/06; G06Q 10/06316; G06Q 30/016; H04L 51/02;
(Continued)

(56) References Cited

U.S. PATENT DOCUMENTS 6,425,012 B1 7/2002 Trovato et al.
2007/0294229 A1 12/2007 Au
(Continued)

FOREIGN PATENT DOCUMENTS

KR 101224660 B1 1/2013

OTHER PUBLICATIONS

Internet Website: USA Today; 'Chatbots' are coming; next stop Facebook, Apr. 8, 2016, 4 sheets. http://www.usatoday.com/story/tech/news/2016/04/07/facebook-f8-chatbots/82754766/.
(Continued)

*Primary Examiner* — Khai N Nguyen
(74) *Attorney, Agent, or Firm* — Lewis Roca Rothgerber Christie LLP

(57) ABSTRACT

In a system for managing chat automation, the system includes: a processor; and a memory coupled to the processor, wherein the memory stores instructions that, when executed by the processor, cause the processor to: receive a signal indicating a communication is being initiated by an end user operating an end user device; receive information from the end user device regarding the communication; select a conversation path based on the information regarding the communication; invoke an automated chat resource for engaging in a chat communication session with the end user device, wherein the automated chat resource is configured to follow the conversation path during the chat communication session; monitor confidence levels of automated chat responses during the chat communication session; and redirect the chat communication session to a second conversation path in response to at least one of the confidence levels falling below a threshold level.

20 Claims, 12 Drawing Sheets

(51) Int. Cl.
*H04M 3/42* (2006.01)
*H04M 3/51* (2006.01)
*H04L 12/58* (2006.01)
*G06Q 30/00* (2012.01)
*G06Q 10/06* (2012.01)
*H04M 3/54* (2006.01)
*H04M 3/493* (2006.01)
*H04M 17/00* (2006.01)

(52) U.S. Cl.
CPC ............ *H04L 51/02* (2013.01); *H04L 51/046* (2013.01); *H04L 51/24* (2013.01); *H04M 3/493* (2013.01); *H04M 3/54* (2013.01); *H04M 17/205* (2013.01)

(58) Field of Classification Search
CPC ...... H04L 51/046; H04L 51/24; H04M 3/323; H04M 3/36; H04M 3/4217; H04M 3/4285; H04M 3/42195; H04M 3/493; H04M 3/4931; H04M 3/4933; H04M 3/4935; H04M 3/4936; H04M 3/4938; H04M 3/42221; H04M 3/51; H04M 3/5166; H04M 3/5175; H04M 3/5183; H04M 3/5191; H04M 3/523; H04M 3/5231; H04M 3/5232; H04M 3/5233; H04M 3/5235; H04M 3/5237; H04M 3/5238; H04M 3/54; H04M 2203/40; H04M 2203/401; H04M 2203/2011; H04M 2203/2061; H04M 2242/00; H04M 2242/08; H04M 2242/12
USPC ............ 379/210.01, 265.01, 265.02, 265.03, 379/265.04, 265.05, 265.06, 265.07, 379/265.08, 265.09, 265.1, 265.11, 379/265.12, 265.13, 265.14, 266.01, 379/266.02, 266.03, 266.04, 266.05, 379/266.06, 266.07, 266.08, 266.09, 379/266.1
See application file for complete search history.

(56) References Cited

U.S. PATENT DOCUMENTS

| | | |
|---|---|---|
| 2011/0078105 A1 | 3/2011 | Wallace |
| 2011/0252108 A1* | 10/2011 | Morris ............... H04L 12/5805 709/206 |
| 2012/0041903 A1 | 2/2012 | Beilby et al. |
| 2014/0270145 A1* | 9/2014 | Erhart .................. H04M 3/523 379/265.13 |
| 2014/0279050 A1 | 9/2014 | Makar et al. |
| 2015/0347900 A1 | 12/2015 | Bell et al. |
| 2016/0065738 A1* | 3/2016 | Schwartz ........... H04M 3/5175 379/265.03 |
| 2016/0127536 A1* | 5/2016 | Jayapalan ........... H04M 3/2281 379/265.02 |
| 2016/0295018 A1 | 10/2016 | Loftus et al. |

OTHER PUBLICATIONS

Internet Website: Retail Dive; How chatbots are going to redefine retail customer service, 6 sheets. http://www.retaildive.com/news/how-chatbots-are-going-to-redefine-retail-customer-service/417458/.

International Search Report and Written Opinion for Application No. PCT/US2017/030786, dated Aug. 11, 2017, 13 pages.

* cited by examiner

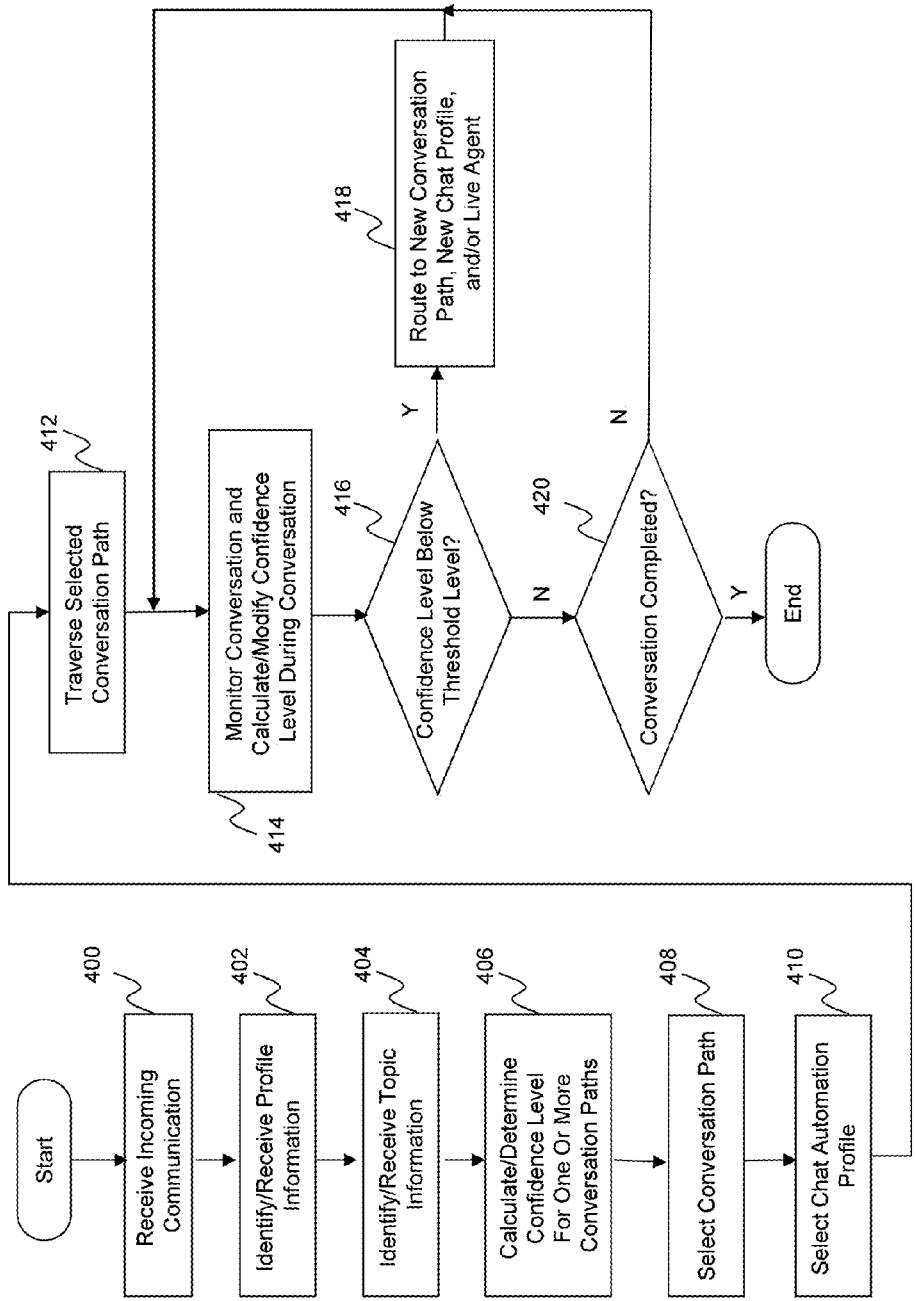

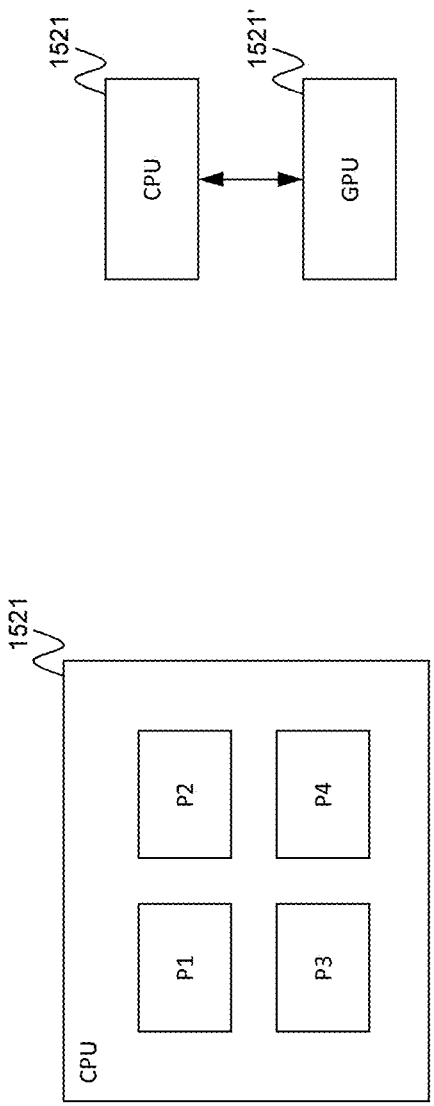

SYSTEM AND METHOD FOR MONITORING PROGRESS OF AUTOMATED CHAT CONVERSATIONS

CROSS-REFERENCE TO RELATED APPLICATION

The present application is related to U.S. Patent Application entitled "SYSTEM AND METHOD FOR MANAGING AND TRANSITIONING AUTOMATED CHAT CONVERSATIONS," filed on even date herewith, the entire content of which is incorporated herein by references.

FIELD

Aspects of embodiments of the present invention relate to a system and method for monitoring the progress of automated chat conversations.

BACKGROUND

In order to remain competitive in the modern commerce system, many businesses remain constantly vigilant of evolving consumer demands, and strive to provide customers with the high quality products and services that they desire. To that end, many businesses employ contact centers that include automated systems and representatives of the business to process transactions and/or service the needs of their customers.

Such contact centers may utilize a number of communication channels to engage with customers, such as telephone, email, live web chat, and the like. For example, in many instances, an end user or customer may be routed to a live human agent to assist the end user with his or her needs.

Utilizing live human agents for all contact center communications can be time consuming for both the business operating the contact center as well as end users or customers who must wait for qualified agents to become available. Furthermore, employing live human agents adds additional overhead costs and complexity to the business operation, which in turn may lead to higher costs to consumers.

The above information discussed in this Background section is only for enhancement of understanding of the background of the described technology and therefore it may contain information that does not constitute prior art that is already known to a person having ordinary skill in the art.

SUMMARY

Embodiments of the present invention are directed to systems and methods for managing chat automation.

According to some embodiments of the present invention,

According to some embodiments of the present invention, in a method for managing chat automation, the method includes: receiving, by a processor, a request for interaction from an end user operating an end user device; receiving, by the processor, information from the end user device regarding the interaction; selecting, by the processor, a first automated chat profile based on the information regarding the interaction; routing, by the processor, the request to an automated chat resource associated with the first automated chat profile; monitoring, by the processor, a chat communication session between the end user device and the automated chat resource; detecting, by the processor, a trigger event during the monitoring of the chat communication; and transitioning, by the processor, the chat communication session to a contact center resource other than the automated chat resource in response to the detected trigger event.

According to some embodiments, the information regarding the communication comprises profile information of the end user.

According to some embodiments, the information regarding the profile information of the end user comprises demographic information of the end user.

According to some embodiments, the information regarding the communication comprises a topic of the communication.

According to some embodiments, the contact center resource comprises an agent device corresponding to a live contact center agent.

According to some embodiments, the contact center resource comprises a second automated chat resource.

According to some embodiments, the first automated chat profile corresponds to a predicted personality of the end user.

According to some embodiments, the first automated chat profile corresponds to demographic information of the end user.

According to some embodiments, the trigger event includes a drop of a confidence level.

According to some embodiments, the method further includes capturing, by the processor, context of the chat communication with the automated chat resource; and transmitting, by the processor, the context to the contact center resource.

According to some embodiments, the context of the chat communication comprises a portion of the chat communication.

According to some embodiments of the present invention, in a system for managing chat automation, the system includes: a processor; and a memory coupled to the processor, wherein the memory stores instructions that, when executed by the processor, cause the processor to: receive a request for interaction from an end user operating an end user device; receive information from the end user device regarding the interaction; select a first automated chat profile based on the information regarding the interaction; route the request to an automated chat resource associated with the first automated chat profile; monitor a chat communication session between the end user device and the automated chat resource; detect a trigger event during the monitoring of the chat communication; and transition the chat communication session to a contact center resource other than the automated chat resource in response to the detected trigger event.

According to some embodiments, the information regarding the communication comprises profile information of the end user.

According to some embodiments, the information regarding the communication comprises a topic of the communication.

According to some embodiments, the contact center resource comprises an agent device corresponding to a live contact center agent.

According to some embodiments, the contact center resource comprises a second automated chat resource.

According to some embodiments, the first automated chat profile corresponds to a predicted personality of the end user.

According to some embodiments, the trigger event includes a drop of a confidence level.

According to some embodiments, the instructions further cause the processor to: capture context of the chat communication with the automated chat resource; and transmit the context to the contact center resource.

According to some embodiments, the context of the chat communication comprises a portion of the chat communication.

According to some embodiments of the present invention, in a method for managing chat automation, the method includes: receiving, by a processor, a signal indicating a communication is being initiated by an end user operating an end user device; receiving, by the processor, information from the end user device regarding the communication; selecting, by the processor, a conversation path based on the information regarding the communication; invoking, by the processor, an automated chat resource for engaging in a chat communication session with the end user device, wherein the automated chat resource is configured to follow the conversation path during the chat communication session; monitoring, by the processor, confidence levels of automated chat responses during the chat communication session; and redirecting, by the processor, the chat communication session to a second conversation path in response to at least one of the confidence levels falling below a threshold level.

According to some embodiments, the method further includes traversing, by the processor, the second conversation path.

According to some embodiments, the method further includes transmitting, by the processor, an instruction to display a proposed response on an agent device corresponding to a contact center agent.

According to some embodiments, the method further includes receiving, by the processor, a modification to the proposed response from the agent device.

According to some embodiments, the method further includes transmitting, by the processor, an instruction to display the proposed response with the modification to the end user device.

According to some embodiments, the method further includes transmitting, by the processor, a signal to route the chat communication to a live agent in response to the confidence level being below a threshold level.

According to some embodiments, the method further includes transmitting, by the processor, an instruction to display a graphical representation of the conversation path on an agent device corresponding to a contact center agent.

According to some embodiments, the method further includes receiving, by the processor, a selection of a second automated chat conversation path from the agent device.

According to some embodiments, the conversation path is a provided by a script.

According to some embodiments, the automated chat responses are based on history and state of the chat communication.

According to some embodiments, the confidence level is determined based on feedback from the end user device.

According to some embodiments of the present invention, in a system for managing chat automation, the system includes: a processor; and a memory coupled to the processor, wherein the memory stores instructions that, when executed by the processor, cause the processor to: receive a signal indicating a communication is being initiated by an end user operating an end user device; receive information from the end user device regarding the communication; select a conversation path based on the information regarding the communication; invoke an automated chat resource for engaging in a chat communication session with the end user device, wherein the automated chat resource is configured to follow the conversation path during the chat communication session; monitor confidence levels of automated chat responses during the chat communication session; and redirect the chat communication session to a second conversation path in response to at least one of the confidence levels falling below a threshold level.

According to some embodiments, the instructions further cause the processor to traverse the second conversation path.

According to some embodiments, the instructions further cause the processor to transmit an instruction to display a proposed response on an agent device corresponding to a contact center agent.

According to some embodiments, the instructions further cause the processor to receive a modification to the proposed response from the agent device.

According to some embodiments, the instructions further cause the processor to transmit an instruction to display the proposed response with the modification to the end user device.

According to some embodiments, the instructions further cause the processor to transmit a signal to route the chat communication to a live agent in response to the confidence level being below a threshold level.

According to some embodiments, the instructions further cause the processor to transmit an instruction to display a graphical representation of the conversation path on an agent device corresponding to a contact center agent.

According to some embodiments, the instructions further cause the processor to receive a selection of a second automated chat conversation path from the agent device.

According to some embodiments, the confidence level is determined based on feedback from the end user device.

BRIEF DESCRIPTION OF THE DRAWINGS

A more complete appreciation of the present invention, and many of the attendant features and aspects thereof, will become more readily apparent as the invention becomes better understood by reference to the following detailed description when considered in conjunction with the accompanying drawings in which like reference symbols indicate like components, wherein:

FIG. 4 is a flow diagram illustrating a method of managing a chat automation system according to some example embodiments of the present invention;

FIG. 6C is a block diagram of a computing device according to an embodiment of the present invention;

FIG. 6D is a block diagram of a computing device according to an embodiment of the present invention.

DETAILED DESCRIPTION

Figure 1:
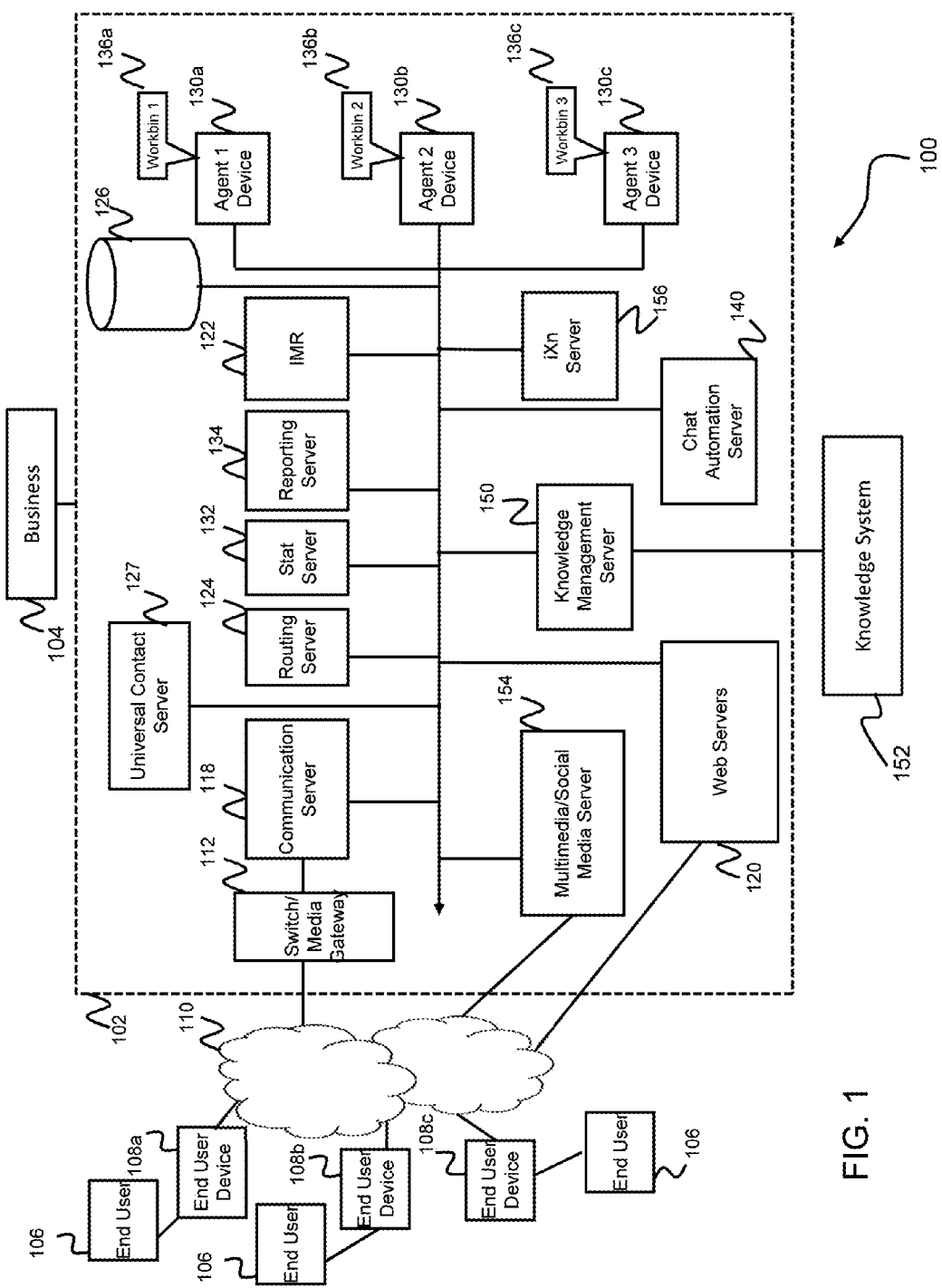
FIG. 1 is a block diagram of a chat automation system according to some embodiments of the present invention.

The present invention is described in one or more embodiments in the following description with reference to the figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

Generally, modern contact centers are staffed with agents or employees who serve as an interface between an organization, such as a company, and outside entities, such as customers. For example, human sales agents at contact centers may assist customers in making purchasing decisions and may receive purchase orders from those customers. Similarly, human support agents at contact centers may assist customers in solving problems with products or services provided by the organization. Interactions between contact center agents and outside entities (customers) may be conducted by speech voice (e.g., telephone calls or voice over IP or VoIP calls), video (e.g., video conferencing), text (e.g., emails and text chat), or through other media.

In order to remain competitive, however, businesses constantly strive to provide high quality service to customers, and also keep prices low. Employing live human agents to handle every interaction with customers adds additional overhead costs to the business, which may eventually be passed on to consumers in the form of higher prices for the products or services sold by the business. In some use cases, automated interactions may be useful for some customers, because the structure and flow of an automated interaction can be optimized and to the point, while a human agent may forget to ask certain questions or follow-up on certain details, even if guided by an agent script. Additionally, coordinating the availability of live human agents qualified to handle a wide variety of customer needs is complicated and time consuming, and may result in lowered satisfaction levels for customers who are waiting for a specialized human agent to become available.

Accordingly, embodiments of the present invention are directed to systems and methods for orchestrating automated chat communications with customers and end users by employing automated chat systems (or chat robots) to engage with customers. According to some embodiments, the customers may not be aware that they are communicating with an automated system rather than a live agent. Additionally, embodiments of the present invention include a system and method for enabling one or more agents to monitor and facilitate multiple different automated chat communications with customers at the same time. According to some embodiments, a conversation may be tagged or identified according to the type(s) of service, customer segment, customer satisfaction level, and the like, and agents may subscribe to monitoring conversations based on one or more tag filters.

As will be appreciated by a person of skill in the art, one of the benefits of utilizing automated chat robots for engaging in chat conversations with human users is that it helps contact centers to more efficiently use valuable and costly resources like human agents, while maintaining customer satisfaction. For example, chat robots may be invoked to initially handle chat conversations without the human customer knowing that it is conversing with a robot. The chat conversation may be escalated to a human agent if and when appropriate. Thus, human agents need not be unnecessarily tied up in handling simple requests, and may instead be more effectively used to handle more complex requests or to monitor the progress of many different automated communications at the same time.

In the various embodiments, the terms interaction and communication are used generally to refer to any real-time and non-real time interaction that uses any communication channel including, without limitation telephony calls (PSTN or VoIP calls), emails, vmails (voice mail through email), video, chat, screen-sharing, text messages, social media messages, web real-time communication (e.g. WebRTC calls), and the like.

FIG. 1 is a block diagram of a system for engaging and managing conversations between an automated chat robot and human users (hereinafter referred to as a chat automation system 100), according to some embodiments of the present invention. In some embodiments, the chat automation system 100 may operate as part of a contact center system 102. The contact center system may be an in-house facility to a business or enterprise 104 for serving the enterprise in performing the functions of sales and service relative to the products and services available through the enterprise. In another aspect, the contact center system 102 may be operated by a third-party service provider. According to another embodiment, the contact center system 102 may operate as a hybrid system in which some components of the contact center system 102 are hosted at the contact center premise and other components are hosted remotely (e.g., in a cloud-based environment). The contact center system 102 may be deployed in equipment dedicated to the enterprise or third-party service provider, and/or deployed in a remote computing environment such as, for example, a private or public cloud environment with infrastructure for supporting multiple contact centers for multiple enterprises. The various components of the contact center may also be distributed across various geographic locations and computing environments and not necessarily contained in a single location, computing environment, or even computing device.

According to one example embodiment, the contact center system 102 includes resources (e.g. personnel, computers, and telecommunication equipment) to enable delivery of services via telephone or other communication mechanisms. Such services may vary depending on the type of contact center, and may range from customer service to help desk, emergency response, telemarketing, order taking, and the like.

Customers, potential customers, or other end users (collectively referred to as customers or end users, e.g., end user 106) desiring to receive services from the contact center system 102 or the business 104 may initiate an inbound communication to the contact center system 102 via their end user devices 108a-108c (collectively referenced as electronic device 108).

Each of the electronic devices 108 may be a communication device conventional in the art, such as, for example, a telephone, wireless phone, smart phone, personal computer, electronic tablet, and/or the like, that is configured to engage in text-based (e.g., chat) communications with other electronic devices. According to some embodiments, users operating the electronic devices 108 may communicate with the contact center system 102 by way of a voice channel, and the communication may be converted into text either at the end user or contact center side. The text may then be transmitted to a chat bot (described in more detail below), and the response from the chat bot may be converted back into speech or delivered to the end user's device as text. Users operating the electronic devices 108 may initiate, manage, and respond to telephone calls, emails, chats, text messaging, web-browsing sessions, and other multi-media transactions.

Inbound and outbound communications from and to the electronic devices 108 may traverse the telephone, cellular, and/or data communication network 110 depending on the type of device that is being used. For example, the communications network 110 may include a private or public switched telephone network (PSTN), local area network (LAN), private wide area network (WAN), and/or public wide area network such as, for example, the Internet. The communications network 110 may also include a wireless carrier network including a code division multiple access (CDMA) network, global system for mobile communications (GSM) network, and/or any 3G or 4G network conventional in the art.

According to one exemplary embodiment, the contact center system 102 includes a switch/media gateway 112 coupled to the communications network 110 for receiving and transmitting telephony interactions between end users and the contact center system 102. The switch/media gateway 112 may include a telephony switch or communication switch configured to function as a central switch for agent level routing within the center. The switch may be a hardware switching system or a soft switch implemented via software. In this regard, the switch 112 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, an agent telephony device. In this example, the switch/media gateway establishes a voice path/connection (not shown) between the calling customer and the agent telephony device, by establishing, for example, a connection between the customer's telephony device and the agent telephony device.

According to one exemplary embodiment of the invention, the switch is coupled to a communication server 118 which may, for example, serve as an adapter or interface between the switch and the remainder of the routing, monitoring, and other communication-handling components of the contact center.

The communication server 118 may be configured to process PSTN calls, VoIP calls, and the like. For example, the communication server 118 may be configured with computer-telephony integration (CTI) software for interfacing with the switch/media gateway and contact center equipment. In one embodiment, the communication server 118 may include a session initiation protocol (SIP) server for processing SIP calls. According to some exemplary embodiments, the communication server 118 may, for example, extract data about the customer interaction such as the caller's telephone number, often known as the automatic number identification (ANI) number, or the customer's internet protocol (IP) address, or email address, and communicate with other CC components in processing the interaction.

According to one exemplary embodiment of the invention, the system further includes an interactive media response (IMR) server 122, which may also be referred to as a self-help system, virtual assistant, or the like. The IMR server 122 may be similar to an interactive voice response (IVR) server, except that the IMR server 122 is not restricted to voice, but may cover a variety of media channels including voice. Taking voice as an example, however, the IMR server may be configured with an IMR script for querying customers on their needs. For example, a contact center for a bank may tell customers, via the IMR script, to "press 1" if they wish to get an account balance. If this is the case, through continued interaction with the IMR server 122, customers may complete service without needing to speak with an agent. The IMR server 122 may also ask an open ended question such as, for example, "How can I help you?" and the customer may speak or otherwise enter a reason for contacting the contact center. The customer's response may then be used by the routing server 124 to route the call or communication to an appropriate contact center system 102 resource.

If the communication is to be routed to an agent, the communication server 118 interacts with a routing server 124 to find an appropriate agent for processing the interaction. The selection of an appropriate agent for routing an inbound interaction may be based, for example, on a routing strategy employed by the routing server 124, and further based on information about agent availability, skills, and other routing parameters provided, for example, by a statistics server 132.

In some embodiments, the routing server 124 may query a customer database, which stores information about existing clients, such as contact information, service level agreement (SLA) requirements, nature of previous customer contacts and actions taken by contact center to resolve any customer issues, and the like. The database may be managed by any database management system conventional in the art, such as Oracle, IBM DB2, Microsoft SQL server, Microsoft Access, PostgreSQL, MySQL, FoxPro, NoSQL, SQLite, and the like, and may be stored in a mass storage device 126. The routing server 124 may query the customer information from the customer database via an ANI or any other information collected by the IMR 122.

Once an appropriate agent is identified as being available to handle a communication, a connection may be made between the customer and an agent device 130*a*-130*c* (collectively referenced as 130) of the identified agent. Collected information about the customer and/or the customer's historical information may also be provided to the agent device for aiding the agent in better servicing the communication. In this regard, each agent device 130 may include a telephone adapted for regular telephone calls, VoIP calls, and the like. The agent device 130 may also include a computer for communicating with one or more servers of the contact center and performing data processing associated with contact center operations, and for interfacing with customers via voice and other multimedia communication mechanisms.

The contact center system may also include a multimedia/social media server 154 for engaging in media interactions other than voice interactions with the end user devices 108. The media interactions may be related, for example, to email, vmail (voice mail through email), chat, video, text-messaging, web, social media, co-browsing, and the like. In this regard, the multimedia/social media server 154 may take the form of any IP router conventional in the art with specialized hardware and software for receiving, processing, and forwarding multi-media events. According to some embodiments, the multimedia/social media server 154 may be configured to maintain chat conversations, generate chat transcripts, and determine whether or not a chat communication is completed (e.g., based on timeout or by a customer closing a chat window). Additionally, the multimedia/social media server 154 may be configured to keep a chat session alive even when a particular chat server instance crashes, and also process or facilitate chat transfers and conference sessions.

The web servers 120 may include, for example, social interaction site hosts for a variety of known social interaction sites to which an end user may subscribe, such as, for example, Facebook, Twitter, and the like. In this regard, although in the embodiment of FIG. 1 the web servers 120 are depicted as being part of the contact center system 102, the web servers may also be provided by third parties and/or be maintained outside of the contact center. The web servers may also provide web pages for the enterprise that is being supported by the contact center. End users may browse the web pages and get information about the enterprise's products and services. The web pages may also provide a mechanism for contacting the contact center, via, for example, web chat, voice call, email, web real time communication (WebRTC), or the like.

According to one exemplary embodiment of the invention, in addition to real-time interactions, deferrable (also referred to as back-office or offline) interactions/activities may also be routed to the contact center agents. Such deferrable activities may include, for example, responding to emails, responding to letters, attending training seminars, or any other activity that does not entail real time communication with a customer. In this regard, an interaction (iXn) server 156 interacts with the routing server 124 for selecting an appropriate agent to handle the activity. Once assigned to an agent, an activity may be pushed to the agent, or may appear in the agent's workbin 136a-136c (collectively referenced as 136) as a task to be completed by the agent. The agent's workbin may be implemented via any data structure conventional in the art, such as, for example, a linked list, array, and/or the like. The workbin 136 may be maintained, for example, in buffer memory of each agent device 130.

According to one exemplary embodiment of the invention, the mass storage device(s) 126 may store one or more databases relating to agent data (e.g. agent profiles, schedules, etc.), customer data (e.g. customer profiles), interaction data (e.g. details of each interaction with a customer, including reason for the interaction, disposition data, time on hold, handle time, etc.), and the like.

According to one embodiment, some of the data (e.g. customer profile data) may be maintained in a customer relations management (CRM) database hosted in the mass storage device 126 or elsewhere. The mass storage device may take form of a hard disk or disk array, flash memory, magnetic table, or other suitable mass storage device as is conventional in the art, for storing information used as part of the chat automation system 100 and the contact center system 102.

According to some embodiments, the contact center system 102 may include a universal contact server (UCS) 127, configured to retrieve information stored in the CRM database and direct information to be stored in the CRM database. For example, the UCS 127 may be utilized as part of the chat automation system 100 to facilitate maintaining a history on how well a particular chat bot (described in more detail below) functions for a given customer as a reference for future chat communications. The UCS 127 may also be configured to facilitate maintaining a history of customers' preferences regarding media channels, such as instances in which chat communications are acceptable and instances in which customers prefer alternate media channels. Additionally, the UCS 127 may be configured to capture and store data regarding comments from agents, customer communication history, and the like.

The contact center system 102 may additionally include a knowledge management server 150 for facilitating interactions between customers operating the end user devices 108a-108c and a knowledge system 152 (which may be included as part of the contact center system 102, or may be operated remotely by a third party). The knowledge management server 152 is a computer system capable of receiving questions and providing answers as output. According to some example embodiments, the knowledge system may be embodied as IBM Watson®. Of course, any other knowledge system may be used as will be appreciated by a person having ordinary skill in the art. In some embodiments, the knowledge system 152 is an artificially intelligent computer system capable of answering questions posed in natural language by retrieving information from information sources such as encyclopedias, dictionaries, newswire articles, literary works, or other documents submitted to the knowledge system 152 as reference materials, as is well known in the art. Additional details of the knowledge management server is provided in U.S. application Ser. No. 14/449,018, filed on Jul. 31, 2014, entitled "System and Method for Controlled Knowledge System Management," the content of which is incorporated herein by reference.

The contact center system 102 may additionally include a chat automation server 140 for conducting and managing automated/electronic chat communications with end users 106 operating end user devices 108. The chat communications may be conducted in such a way that the end users are not aware that they are communicating with an automated system, as opposed to a human agent, although embodiments of the present invention are not limited thereto, and in some embodiments, end users may be aware that they are interacting with an automated system. According to some embodiments, the chat automation server 140 may operate as a chat orchestration server, dispatching actual chat conversations to various chat bots or agent chats. The processing logic of the chat automation server 140 may be rules driven, and may leverage, for example, intelligent workload distribution protocols and various business rules for routing communications.

Additionally, the chat automation server 140 may be configured to facilitate (e.g., supervise and coordinate) self-learning by individual chat bots. For example, prior to characteristics of individual chat bots being modified, the chat automation server 140 may determine whether various end user input or feedback that may modify the chat bot is suspicious or malicious (e.g., by searching for or identifying key words or phrases, and/or flagging potential issues for review by an agent).

According to one embodiment, the chat automation server 140 is coupled to the interaction server 156, statistics server 132, and/or the like, for allowing automated chat sessions to be escalated/transferred/routed to human agents when appropriate. The chat automation server 140 may also be coupled to the knowledge management server 150 for receiving, for example, suggestions on answers to queries posed by customers during an automated chat session, for providing links to knowledge articles, and/or the like. Although the chat automation server 140 is depicted in the embodiment of FIG. 1 as being a separate server component, a person of skill in the art should recognize that functionalities of the chat automation server may be incorporated into the multimedia/social media server 154, the knowledge management server 105, the IMR server 122, or the like.

The contact center system 102 may also include a reporting server 134 configured to generate reports from data aggregated by the statistics server 132. Such reports may include near real-time reports or historical reports concerning the state of resources, such as, for example, average waiting time, abandonment rate, agent occupancy, and the like. The reports may be generated automatically or in response to specific requests from a requestor (e.g. agent/administrator, contact center application, and/or the like).

The various servers of FIG. 1 may each include one or more processors executing computer program instructions and interacting with other system components for performing the various functionalities described herein. The computer program instructions are stored in a memory implemented using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

Figure 2A:
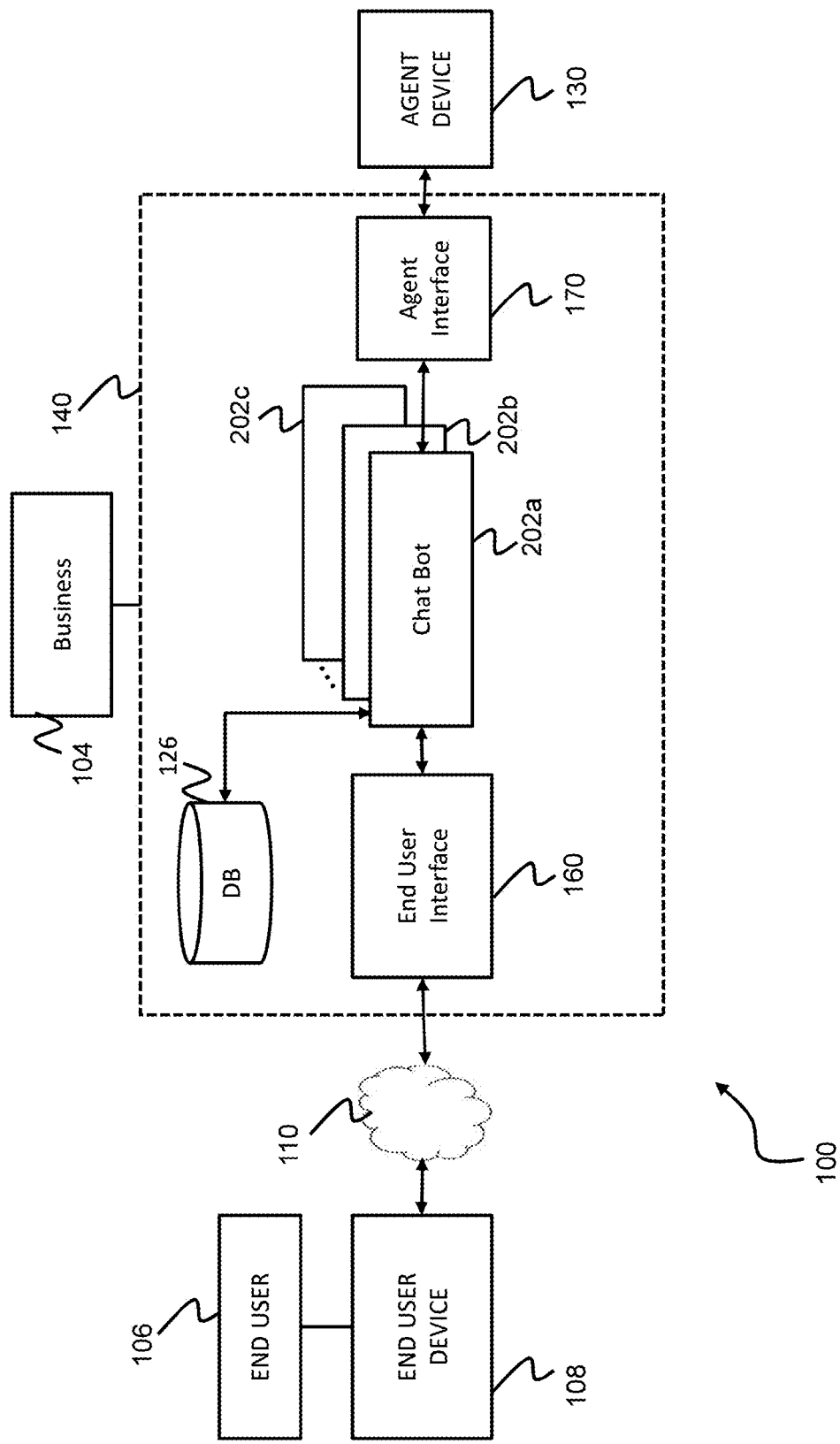
FIGS. 2A and 2B are schematic block diagrams showing further details of a chat automation server operating as part of the chat automation system according to some embodiments of the present invention.

FIG. 2A is a more detailed schematic block diagram of the chat automation server 140 operating as part of the chat automation system 100, according to some embodiments of the present invention. The chat automation server 140 is coupled to (e.g., in electronic communication with) the end user device 108 operated by the customer 106 over the data communications network 110. As discussed above, the chat automation server 140 may be operated by the business 104 as part of the contact center system 102 (shown in FIG. 1), for engaging in automated chat conversations with the customers of the business. In this regard, the chat automation server 140 hosts one or more chat automation modules 202a-202c (collectively referenced as 202), configured with computer program instructions for engaging in the automated chat conversations. Chat automation modules 202 may also be referred to as chat robots, chat bots, chatterbots, dialog systems, conversational agents, automated chat resources, or the like.

The chat bots 202 may operate, for example, as an executable program that can be launched according to demand for the particular chat bot. According to some embodiments, the IMR 122 may operate as an execution engine or environment for the chat bots 202, analogous to loading VoiceXML files to a media server for interactive voice response (IVR) functionality. Loading and unloading may be controlled by the chat automation server 140, analogous to how a VoiceXML script may be controlled in the context of an interactive voice response. The IMR 122 may provide a common means for capturing and passing collecting user data in a unified way, similar to user data capturing in the context of IVR. Such data can be stored (e.g., in the CMR database), shared, and utilized in follow-up conversation steps, whether with the same chat bot, a different chat bot, an agent chat, or even a different media type. According to one embodiment, the chat automation server 140 is configured to orchestrate the sharing of data among the various chat bots as interactions are transferred or transitioned over from one chat bot to another, or from one chat bot to a human agent. According to one embodiment, the data captured during interaction with a particular chat bot may be transferred along with a request to invoke a second chat bot or human agent.

In one embodiment, the number of chat bots 202 may vary according to the design and function of the chat automation server 140, and is not limited to the number illustrated in FIG. 2A. For example, different chat bots may be created to have different profiles. The profile of a particular chat bot may be used to select a chat bot with expertise for helping a customer on a particular subject control, for example, how the chat bot communicates with a particular customer. Engaging chat bots with profiles that are catered to specific types of end users 106 may allow more effective communication with such users. For example, one chat bot may be designed or specialized to engage in a first topic of communication (e.g., opening a new account with the business 104), while another chat bot may be designed or specialized to engage in a second topic of communication (e.g., technical support for a product or service provided by the business 104), that is different from the first topic of communication. In another example, the chat bots may be configured to utilize different dialects or slang, or may have different personality traits or characteristics. For example, the vocabulary of the different chat bots may be tailored to use the slang or diction of young people, elder people, people in a certain region of the country, and/or people having a certain language or ethnic background.

The chat automation server 140 may also host a default chat bot that may be invoked at a beginning of a chat conversation if there is insufficient information about the customer to invoke a more specialized chat bot. For example, if a customer intent is unknown when the conversation initially ensues, the default chat bot may be invoked to ask questions about the customer intent.

In one embodiment, a chat bot's profile is stored in a profile database hosted in the mass storage device 126. The chat bot's profile data may include, without limitation, the chat bot's personality, gender, demographics, areas of expertise, and the like. According to some embodiments, a chat bot may be user selectable, for example, based on accent, appearance, age group, language, etc., by way of a user interface. Additionally, a chat bot may be assigned to a user based on demographic information of the user. According to some embodiments, a chat bot profile may be selected based on information learned from publicly available information (e.g., social media information) about a user.

According to some embodiments, for a given subject, including receptionist and concierge services, and specialists on particular products or services (e.g., travel booking, opening accounts, etc.), there may be several different chat bots 202, each with their own personality or profile. Each of the different chat bots 202 may be configured, in conjunction with the chat automation server 140, to learn and evolve their behavior and responses according to user input. For example, in response to users reacting negatively to certain words, phrases, or responses, the chat bots 202 may learn to use different words, phrases, or responses. According to some embodiments, such learning may be supervised in order to prevent undesired evolution of the personalities or profiles of the chat bots 202. For example, changes to the personalities or profiles of the chat bots 202 may be first approved or validated by human supervisors, certain keywords or phrases may be identified or flagged, and customer feedback may be analyzed.

According to some embodiments, different chat bots 202 may be configured to learn from each other, in addition to learning based on user feedback or agent feedback. For example, different chat bots 202 may be configured to communicate and exchange data with each other. In some embodiments, the different chat bots 202 may operate as a neural network for deep learning and self-learning capabilities, by exchanging data with one another.

The chat automation server 140 may also be configured with an end user interface module 160 for facilitating or coordinating communication between the customer 106 and the chat automation server. According to some embodiments, the chat automation server 140 may be implemented in a layered architecture, with a media layer, a media control layer, the chat bots executed by way of the IMR 122 (similar to executing a VoiceXML on an IVR media server), and chat bot management. The chat automation server 140 may further include an agent interface module 170 for facilitating or coordinating communication between an agent operating an agent device 130 and the chat automation server 140.

Additionally, the end user interface 160 and the agent interface 170 may operate to facilitate or coordinate the exchange of text-based or chat communications between the end user device 108 and the agent device 130. That is, the end user interface 160 may operate to transmit and receive signals to and from the end user device 108 during a chat communication session. For example, the end user interface 160 may transmit signals to the end user device 108 for displaying a message or text-based communication on a display of the end user device 108 by way of the network 110, and may receive signals from the end user device 108 that include text based or chat communication messages from the end user 106.

The chat automation server 140 may further be configured to interact with the knowledge management server 150 to query the server for knowledge information. The query may be based, for example, based on a question received from the customer 106. Responses received from the knowledge management server 150 may then be provided to the customer as part of a chat response.

According to one embodiment, the chat automation server 140 may run on the same computer as the other servers of the contact center depicted in FIG. 1. The chat automation server 140 may also run on a separate computer equipped with a processor or central processing unit (CPU) (not shown), which executes program instructions and interacts with other system components to perform various methods and operations according to embodiments of the present invention. According to this latter embodiment, the chat automation server 140 further includes a memory (not shown), which operates as an addressable memory unit for storing software instructions to be executed by the CPU. The memory is implemented using any suitable memory device, such as a random access memory (RAM), and may additionally operate as a computer readable storage medium having non-transitory computer readable instructions stored therein that when executed by the processor cause the processor to control and manage an automated chat communication between the chat automation server, the end user device 108, and/or the agent device 130.

Figure 2B:
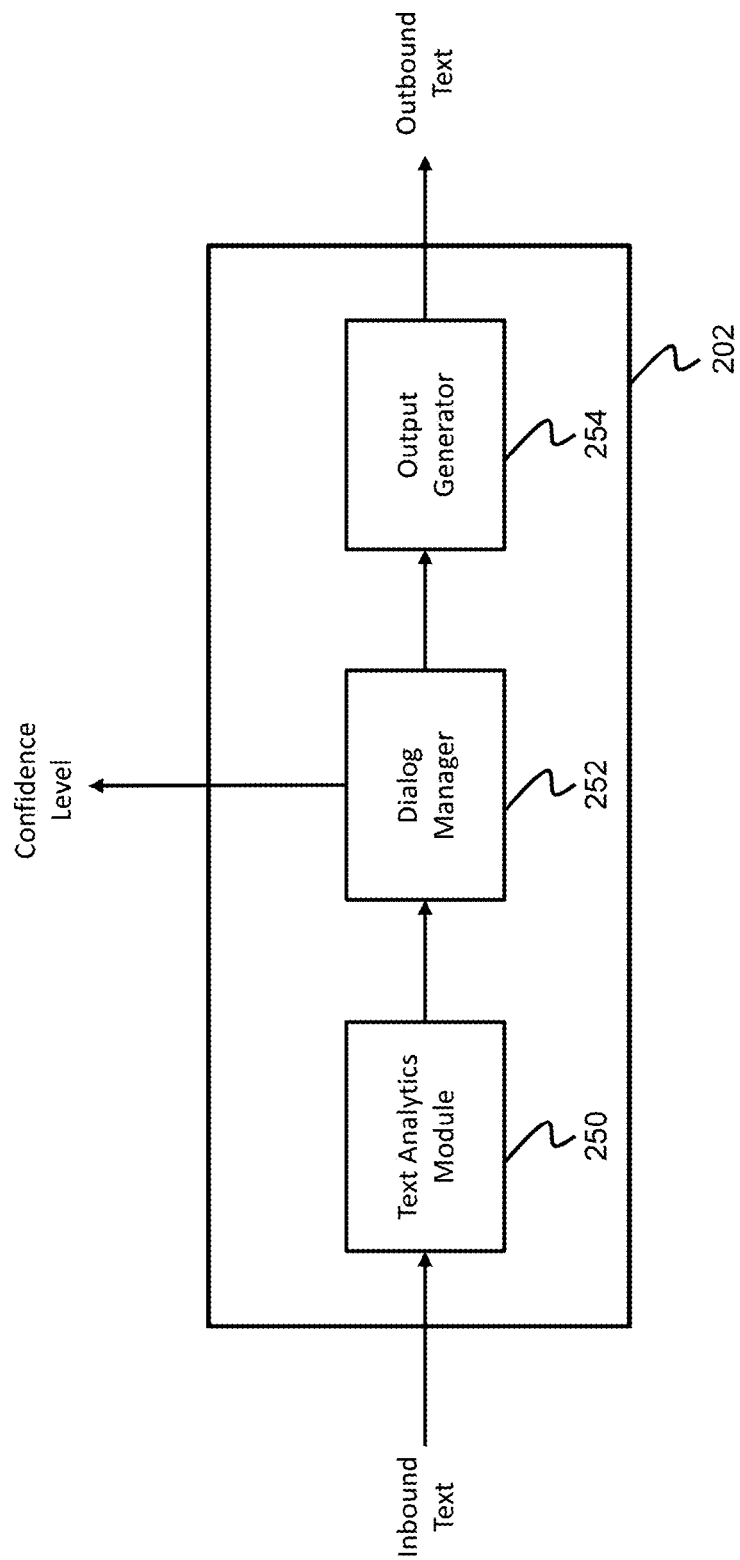

FIG. 2B is a more detailed block diagram of an exemplary chat bot 202 according to one embodiment of the invention. In the exemplary embodiment of FIG. 2B, the chat bot 202 includes a text analytics module 250, dialog manager 252, and output generator 254. The text analytics module is configured to analyze and understand natural language. In this regard, the text analytics module may be configured with a lexicon of the language, a syntactic/semantic parser, and grammar rules for breaking a phrase provided by the end user device 108, into an internal syntactic and semantic representation. According to one embodiment, the configuration of the text analytics module depends on the particular profile associated with the chat bot. For example, certain slang words may be included in the lexicon for one chat bot, but excluded from another chat bot.

The dialog manager 252 receives the syntactic and semantic representation from the text analytics module, and manages the general flow of the conversation based on a set of decision rules. In this regard, the dialog manager maintains history and state of the conversation, and generates an outbound communication based on the history and state. The communication may follow the script of a particular conversation path selected by the dialog manager. As described in further detail below, the conversation path may be selected based on an understanding of a particular purpose or topic of the conversation. The script for the conversation path may be generated using any of various languages and frameworks conventional in the art, such as, for example, Artificial Intelligence Markup Language (AIML), SCXML, or the like.

The dialog manager 252 selects a response deemed to be appropriate at the particular point of the conversation flow/script, and outputs the response to the output generator 254. According to one embodiment, the dialog manager 252 may also be configured to compute a confidence level for the selected response, and provide the confidence level to the agent device 130.

According to some embodiments, every segment, step, or input in a chat communication may have a corresponding list of possible responses. Responses may be categorized based on topics (determined using a suitable text analytics and topic detection scheme), and suggested next actions are assigned. Actions may include, for example, responses with answers, additional questions, assignment for a human to assist (e.g., by disambiguating input from the end user), and the like.

The confidence level may be utilized to assist the system with deciding whether or not the detection, analysis, and response to end user input is appropriate or sufficient, or whether a human should be involved, as will be discussed in more detail below. For example, a threshold confidence level may be assigned to invoke human agent intervention, based on one or more business rules. According to some embodiments, confidence level may be determined based on customer feedback. For example, in response to detecting a negative reaction from a user to an action or response taken by the chat bot, the confidence level may be reduced. Conversely, in response to detecting a positive reaction from a user, the confidence level may be increased.

According to one embodiment, the response selected by the dialog manager 252 may include information provided by the knowledge management server 150. The information may be, for example, a link to a knowledge article that the chat bot may want to recommend to the customer in response to a question posed by the customer.

The output generator takes the semantic representation of the response provided by the dialog manager, maps the response to a chat bot profile or personality (e.g., by adjusting the language of the response according to the dialect, vocabulary, or personality of the chat bot), and outputs an outbound text to be displayed at the end user device 108. According to one embodiment, the output text may be aimed to be such that the human customer interacting with the chat bot is unaware that it is interacting with an automated system as opposed to a human agent.

Figure 3A:
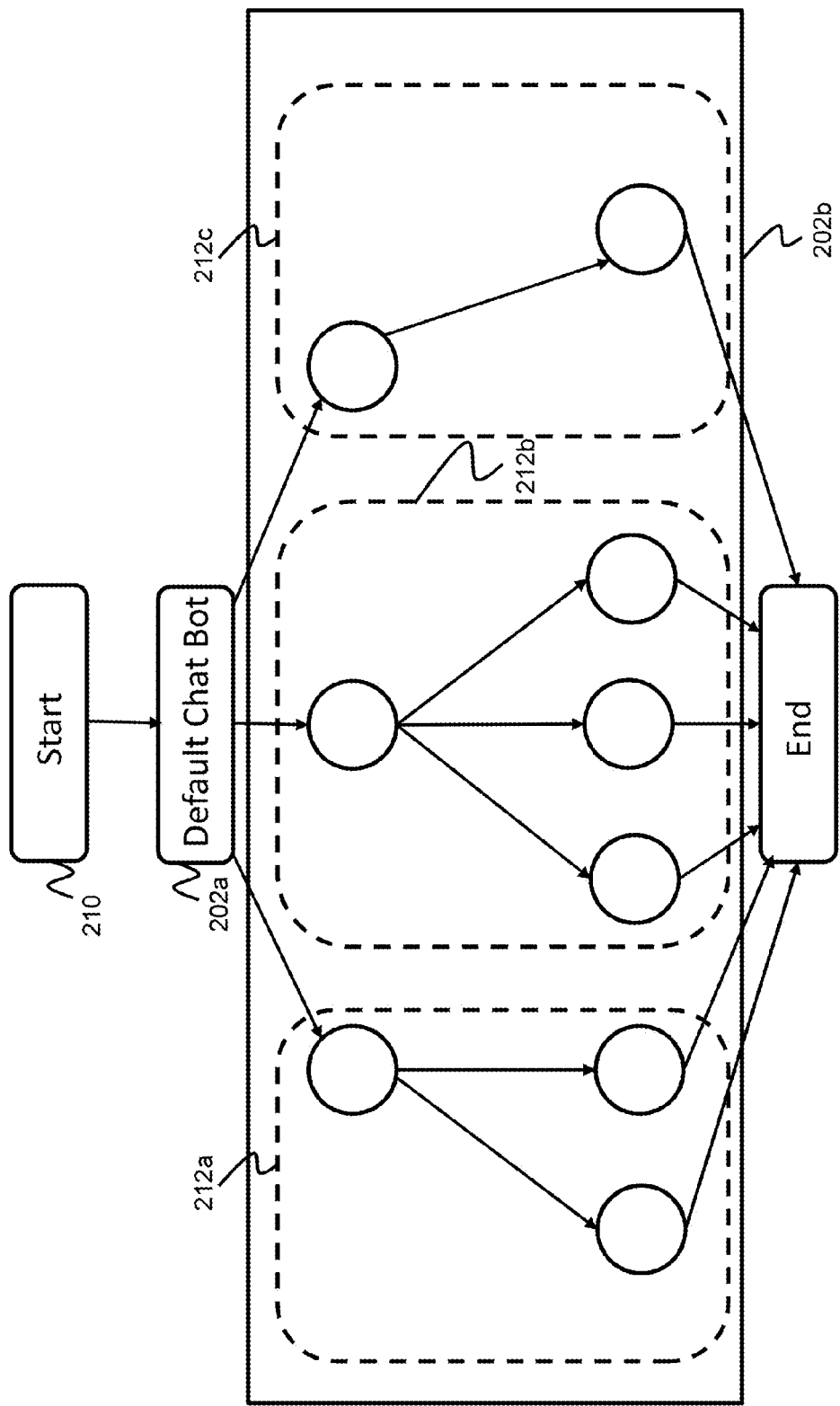
FIGS. 3A-3C illustrate an example scenario for managing an automated chat communication according to an example embodiment of the present invention.
Figure 3B:
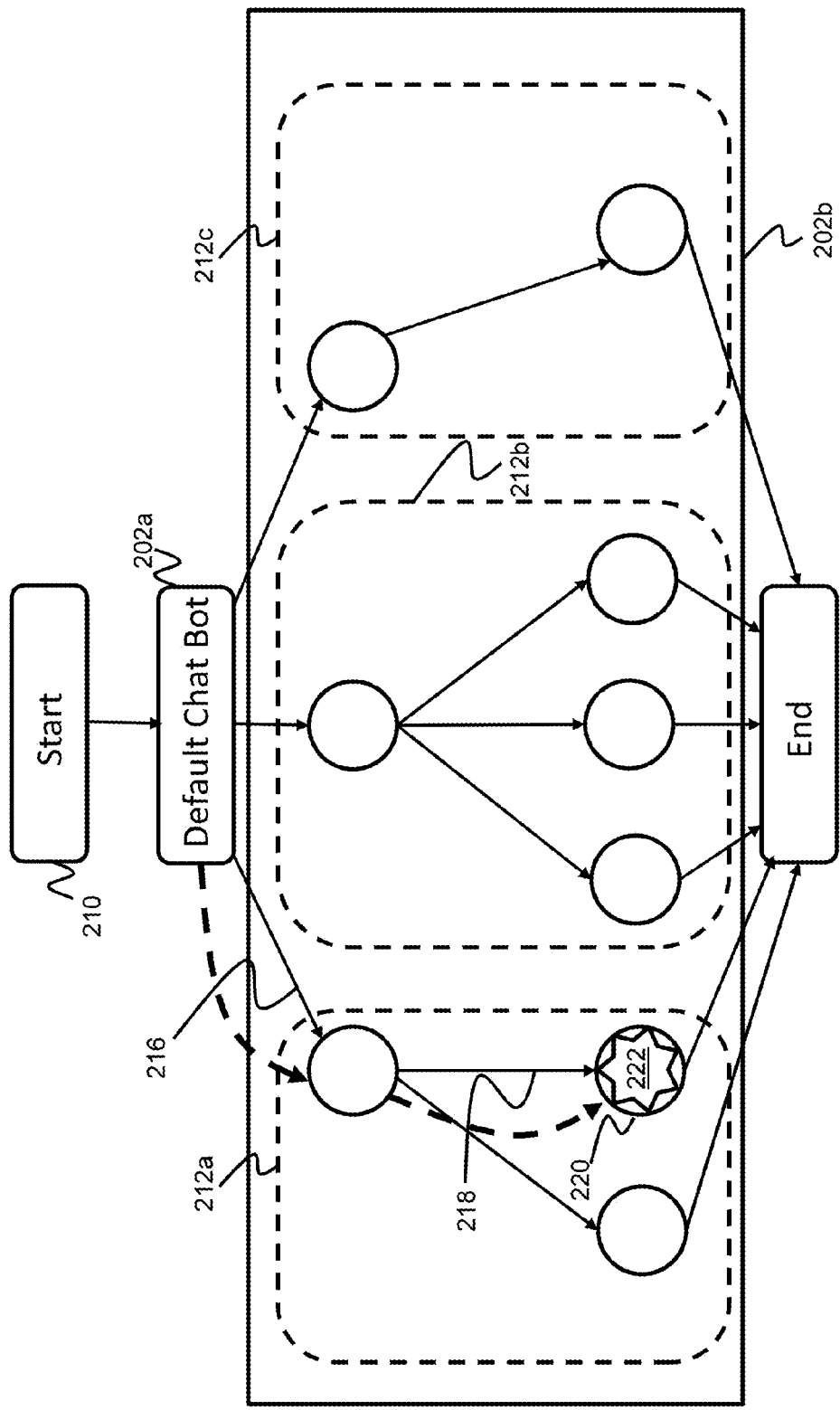
Figure 3C:
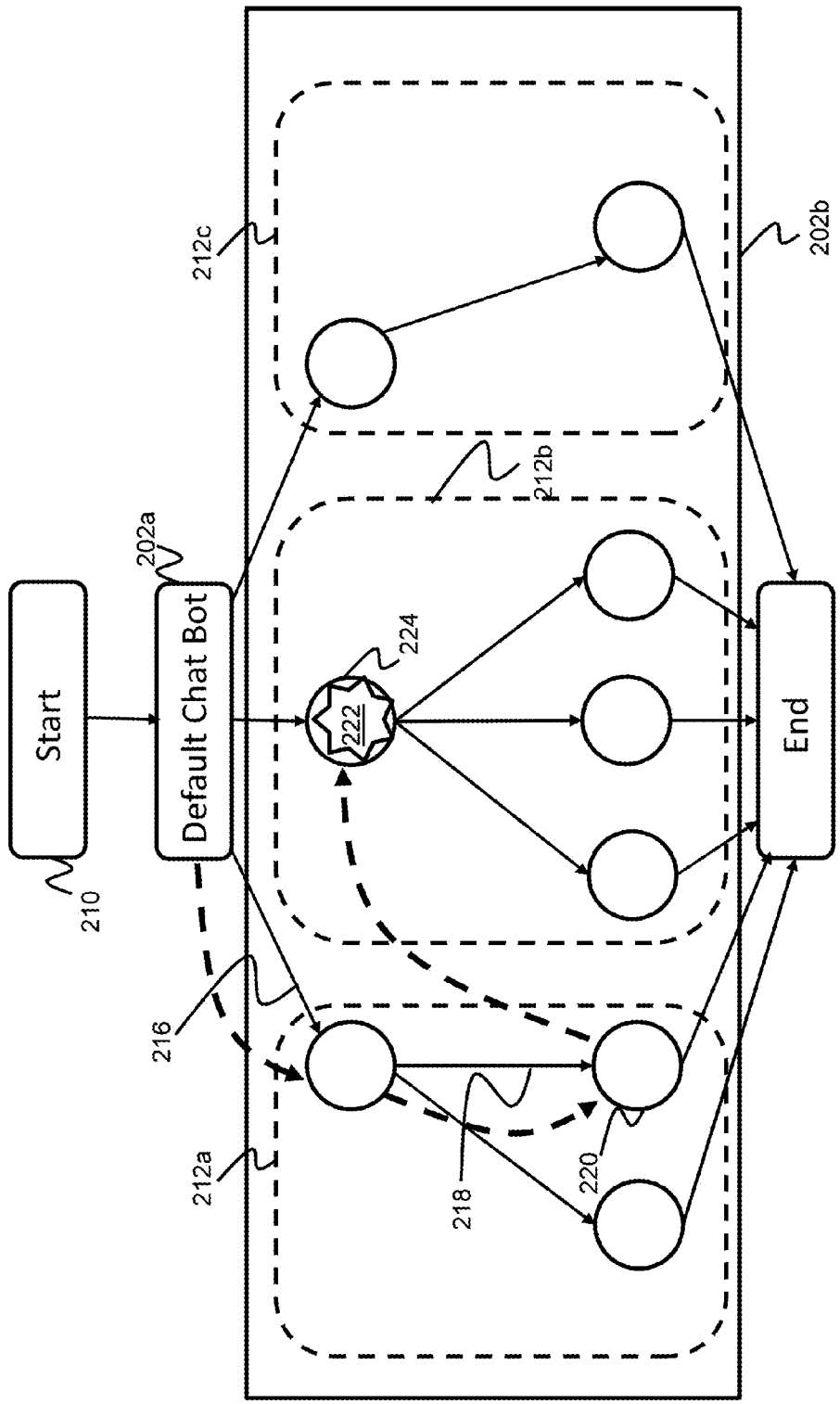

FIGS. 3A-3C are conceptual layout diagrams of various conversation paths that may be invoked during a chat conversation according to some example embodiments of the present invention.

As illustrated in FIG. 3A, at the start 210 of a chat communication session, a default chat bot 202a is invoked (e.g., as an automated receptionist or concierge) for identifying, for example, a topic of the communication. For example, the default chat bot 202a may transmit, by way of the end user interface 160, a message to the end user device 108 a chat or text-based message inquiring as to the purpose/intent of the communication (e.g., "How can I help you today?"). Additionally, according to some embodiments, the default chat bot 202a may transmit a message to the end user device 108 a chat or text-based message asking the end user 106 to provide identifying information about the end user 106, or may determine profile information from a user account associated with the end user 106.

In response, the default chat bot 202a may receive one or more chat or text-based communications from the end user device 108. The default chat bot 202a may then analyze the text-based communications, as discussed above, to identify one or more potential purposes or topics for the communication and/or one or more pieces of information for identifying the end user 106. In some instances, the user may remain anonymous initially, or throughout an entire communication session. Additionally, according to some embodiments, in circumstances in which the default chat bot 202a is unable to identify a topic or purpose, the chat bot 202a may politely terminate the communication or trigger transfer of the communication to a live agent.

According to some embodiments of the present invention, based on identification information of the end user 106, previous communication history (e.g., with the business 104 or on a third party platform such as a social networking website) of the end user 106, and/or the purpose or topic for the communication, the default chat bot 202a may select a particular chat bot 202b having a profile that is deemed to be compatible with the profile of the end user 106. For example, the default chat bot 202a may select a particular chat bot 202b having a suitable vocabulary or diction based on the background or age of the end user 106, and a suitable specialization to appropriately or effectively handle the purpose of the communication. Profile and/or personality matching may also be subject to learning by the chat automation system 100, for example, by analyzing input from end users. When a selected profile or personality is determined to not be a good match for a particular customer or particular type of customer, communications may be redirected to a different chat bot with a different personality or profile, and the chat automation system 100 may learn not to make such matches in the future with customers having the same or similar characteristics. When a communication session is transitioned from one chat bot to another chat bot, context data about the communication session with the first chat bot may be stored and made available to the next chat bot (e.g., in the form of a transcript or aggregated/summarized data) and leveraged for avoiding repeating the same dialog.

According to some embodiments, if the chat automation system 100 is unable to determine the proper chat bot personality or profile, multiple chat bots 202 may be executed concurrently. In such instances, according to some embodiments, only one chat bot may have an active response channel to the end user, and the other chat bot(s) may execute in silent mode, receiving customer requests but making their responses visible to other chat bots and/or contact center agents. Accordingly, a potential backup chat bot may be enabled to remain synchronized with the communication session in case a transition is made to the backup chat bot.

According to one embodiment, the particular chat bot 202b selected by the default chat bot 202a may have various conversation paths or scripts that it may follow based on, for example, the customer intent. According to some embodiments of the present invention, the chat bot 202a or 202b1 may identify or calculate a confidence level of the purpose of the communication from among of plurality of different possible communications purposes or paths 212a-212c that are predetermined. The number of possible predetermined communication or conversation paths or purposes may vary according to the design and function of the chat automation system 100, and is not limited to the number illustrated in FIG. 3A. The chat automation system 100, however, may be designed such that all (or substantially all) communications conducted with an end user can be categorized into a finite number of categories (e.g., account support, product or service technical support, sales, billing, other, etc.).

When initially handling a communication with an end user, the chat bot 202a or 202b may calculate or determine a probability or confidence level to each path based on text analysis of the response from the end user 106. According to some embodiments, the chat bot 202a or 202b may be configured to ask additional follow-up questions as to the purpose or topic of the communication until the confidence level calculated for at least one of the paths exceeds a threshold level that may be predetermined. Then, the chat bot 202b may proceed with traversing through subsequent steps or stages in the communication along the path with the highest confidence level.

FIG. 3B illustrates a process of traversing down a selected path according to some embodiments of the present invention. As illustrated in FIG. 3B, the chat bot 202b may proceed to a first step or stage in a conversation flow corresponding to a selected path 216, at which point information is exchanged between the chat bot 202b and the customer. For example, the chat bot 202b may ask additional questions or receive questions from the end user 106 in order to progress through the conversation path down a sub-path 218 to a subsequent stage 220 in the conversation flow.

According to one embodiment, the chat bot 202b is configured to monitor confidence levels of its automated chat responses during the chat communication session. In this regard, at each stage in the communication path (the term "conversation path" may be used synonymously with the term "communication path" herein), the chat bot 202b may calculate or modify the confidence level of a response provided by the chat bot 202b per the selected conversation path. If the confidence level of the chat bot 202b falls below a threshold level that may be predetermined, the chat bot may transmit an alert or signal to an agent device 130 (e.g., by way of the agent interface 170) to notify an agent that the confidence level has fallen below the threshold level.

In response to the confidence level dropping below a certain threshold level, according to some embodiments, the chat automation system 100 may attempt to route the communication to a live agent (e.g., in conjunction with the other systems and components of the contact center system 102 described above) to continue the communication. For example, the chat automation server 140 may transmit a transfer request to the routing server 124. The request may include, for example, information about the current chat communication that the routing server 124 may use to find an appropriate agent. As with a telephony call, the routing server 124 may find an appropriate agent according to an identified routing strategy, and further based on information about agent availability, skills, profiles, and other routing parameters provided by, for example, the statistics server 132. According to some embodiments, if a live agent is not available, the chat automation server 140 may continue to attempt to conduct the automated chat communication with the end user until the confidence level falls below a lower threshold level. Additionally, in some embodiments, the chat automation server 140 may attempt to delay or drag the conversation along while waiting for a live agent to become available. For example, the chat automation server 140 may ask additional questions such as where the customer is located, their call back number, their email address, or engage in small talk. The speed of responses from the chat bot may vary in proportion to the expected availability time for a live human agent, and if the delay exceeds a threshold delay time for connecting to a live human agent, the chat automation server 140 may cause the chat bot to propose a callback. Alternatively, the chat bot may explain to the customer that it is trying to connect or transfer to an agent, and provide an estimated time by which the connection will be made, at which point the customer may decide whether or not to continue with the chat bot. Additionally, while awaiting an available agent, the chat automation server 140 may pursue another topic or issue in which the customer is interested, either with the same chat bot or a different one.

According to some embodiments, an agent (e.g., a supervising agent) may be able to monitor, by way of the agent interface 170 and an agent device 130, the status of a plurality of ongoing automated chat communications being conducted by the chat automation server 140. In this regard, the chat automation server 140 may display an indicator or marker 222 indicating the current stage or state in the conversation flow for a given chat communication session and/or other contextual information such as background or demographic profile information about the end user, information about previous interactions with the business 104, relevant chat history for the ongoing or previous chat communications, the confidence level of the chat automation server 140, and the like. Additionally, the chat automation server 140 may display or expose its own rationale for pursuing a given topic or conversation path, such as by highlighting words or phrases used by the end user 106, and identifying or illustrating how those phrases match or correspond to one or more concepts of categorization. The chat automation system 100 may also display a graphical representation of the confidence level, and various pieces of information showing how the confidence level was calculated or determined.

For example, according to some embodiments, the chat bot may display a graphical indicator (e.g., by way of the agent interface 170) representing the confidence level or engagement tone. A low confidence level may invoke a graphic or color illustrating confusion or that the chat bot is thinking, and higher confidence scores may invoke a more confident image or color. Additionally, the chat bot may illustrate (e.g., by way of the agent interface 170) paths or topics of conversations that have been followed, and a summary or indication of the communication with the end user that led to the path or topic being determined or chosen. The chat bot may further pose questions to a monitoring agent/supervisor, or another chat bot, which may indicate the confidence level of the chat bot based on the nature of the questions.

Accordingly, by monitoring an ongoing chat communication, along with additional contextual information, the chat bot 202 may be redirected to a new path or communication topic 224, as illustrated in FIG. 3C. According to some embodiments, agent monitoring or being alerted to a chat communication with the chat automation system 100 may be able to redirect the chat automation system 100 to the new path by clicking on or selecting a graphical representation of the new communication path, or by dragging the indicator 222 to the new path 224. According to one embodiment, communication paths represent discussions within a topic. If a human detects that the current chat bot conversation is misaligned with a common topic or subtopic, the human may redirect the chat bot to a more appropriate topic or subtopic. For example, an agent may utilize a graphical user interface (e.g., a visual topic tree or flow diagram) to drag or redirect a marker or indicator showing the current status of the communication to an alternative path or topic (e.g., as illustrated in FIG. 3C). Alternatively, prior to transmitting a response to the end user, the chat automation server 140 may display a proposed response to a monitoring agent (e.g., by way of the agent interface 170), which the agent can then modify or edit before the response is sent to the end user. In response to such modifications, the chat bot and/or the chat automation server 140 may be enabled to identify a new topic, communication path, or chat bot profile/personality to continue the communication session.

In some instances, the chat automation server 140 may wait for input from the end user before allowing the conversation path to be redirected to a new conversation path. For example, in instances where the current stage 220 is a self-contained or nested topic, or involves receiving authentication or profile information from the end user 106, the chat automation server 140 may wait until receiving input from the end user 106 before redirecting, rather than interrupting the end user 106. Accordingly, the chat automation server 140 may enable or block the transition from one communication path to another communication path depending on the nature of the present stage.

According to some embodiments, the agent monitoring or alerted to an ongoing chat communication, or the chat automation server 140 itself may determine that the cause of the decline in confidence level is due to a mismatch between the end user 106 and the selected chat automation profile. For example, if certain words or phrases are detected to be misunderstood or bothersome to the end user 106, the agent or the chat automation server 140 may be redirected to utilize a different chat bot 202 that is better suited to the needs and sensibilities of the end user 106.

FIG. 4 is a flow diagram for a method of managing a chat automation system according to some example embodiments of the present invention.

The method starts and, at operation 400, the chat automation server 140 receives an incoming communication. For example, an end user 106 may access, via an end user device 108, a chat communication user interface (e.g., through an Internet website) operated by or on behalf of the business 104, to transmit a request for interaction with the contact center. The chat communication interface may, for example, be facilitated by the chat automation server 140 and the end user interface 160.

At operation 402, the chat automation server 140 identifies or receives profile information corresponding to the end user 106 and/or the interaction. For example, according to some embodiments, the end user 106 may log into a personal account of an Internet website associated with the business 104. The chat automation server 140 may then retrieve or identify personal identifying information that was previously provided by the end user 106 from a database 126. The personal identifying information may include various demographic information about the end user 106 such as the end user's name, age, gender, language ability or background, and ethnic or national origin background, as well as information about the end user's relationship to the business 104, such as previous purchase history, product or service preferences, and previous interactions with the business 104 or its employees or agents. Information collected by, for example, the website (products viewed or clicked on by the user), prior to the user requesting the interaction, may also be forwarded to the chat automation server 104.

According to some embodiments, one or more aspects of the personal identifying information about the end user 106 may be collected as part of the chat communication at operation 402. For example, the chat automation server 140 may ask the end user 106 one or more predetermined questions from which the personal identifying information may be determined directly or otherwise inferred based on the responses provided from the end user 106.

At operation 404, the chat automation server 140 identifies or receives topic information for the chat communication. For example, according to some embodiments, the chat automation server 140 may directly ask one or more questions to the end user 106 inquiring as to the nature or purpose of the chat communication (e.g., "How may I help you today?"). According to some embodiments, the chat automation server 140 may retrieve information about previous interactions between the end user 106 and the chat automation server 140, the contact center system 102, and/or the business 104, and ask the end user 106 whether or not the end user 106 wishes to continue or follow-up on the previous interaction. When concatenating multiple conversation legs (e.g., by invoking sequentially different chat bots or communication sessions), different previous communication sessions may have unfinished history, in which case the chat automation server 140 may directly inquire about the nature or purpose(s) of the present communication session.

According to some embodiments, the chat automation server 140 may receive input from the end user 106 from which the chat automation server 140 can determine or infer the nature or purpose of the chat communication, without the chat automation server 140 first inquiring about the purpose of the chat communication. That is, in some instances, the end user 106 may initiate the chat communication with the chat automation server 140 and proactively describe the purpose of the communication.

Based on the topic information and/or the profile information, the chat automation server 140 may proceed, at operation 406, to calculate or determine a confidence level for one or more potential conversation paths. In the case that multiple conversation topics or paths are identified as being potential conversation paths, the chat automation server 140 may group and/or arrange the various topics or paths in a logical order, for example, based on the capabilities of available chat bots, in order to reduce the number of potential changes from one chat bot to another. Such grouping or arranging may also be optimized or organized for achieving one or more business outcomes.

For example, as part of the design of the chat automation server 140, it may be determined that all or substantially all chat communications will follow a finite number of potential conversation topics or paths (e.g., creating/managing an account, product or service support, product or service purchases, etc.). The chat automation server 140 may determine, based on the input received from the end user 106 (e.g., profile and topic information) a confidence level or probability that the end user 106 wishes to proceed down each of the different predetermined topics or paths. The chat automation server 140 may then select a conversation path based on the confidence level determination, for example, by selecting the conversation path with the highest confidence level.

According to some embodiments of the present invention, the chat automation server 140 may additionally select, at operation 410, a chat automation profile from among a plurality of chat automation profiles. For example, as discussed above with respect to FIG. 2, the chat automation server 140 may include a plurality of chat automation profiles with different characteristics or specializations that may be utilized to conduct an automated chat session.

For example, different chat automation profiles may have attributes or characteristics that make them well-suited for managing chat communications regarding one or more specific topics, whereas other chat automation profiles may have attributes or characteristics that make them well-suited for managing chat communications regarding one or more different specific topics. That is, the different chat automation profiles may be configured to, for example, interpret different words or phrases provided by the end user 106 differently, depending on the context of the conversation topic. Additionally, different chat automation profiles may be configured to utilize different types of vocabulary or diction according to the corresponding profile of the end user 106. For example, depending on the demographic profile of the end user 106, a chat automation profile may be selected such that the diction or vocabulary of utilized by the chat automation profile matches or corresponds to that of the end user 106, such that the end user 106 will understand the words used by the chat automation profile and feel comfortable engaging with the chat automation profile during a chat communication.

Once a conversation path is selected and/or a chat automation profile is selected, the selected conversation path may be traversed, at operation 412. To that end, a selected chat bot may, for example, ask and answer various questions to and from the end user 106, by way of the end user interface 160, to attempt to resolve the needs of the end user 106. In many instances, the chat bot may traverse down one or more sub-paths of conversation, depending on the input provided by the end user 106.

During the chat communication session, the chat automation server 140 may monitor, at operation 414, the chat communication conversation (e.g., the input received from the end user 106) for various trigger events, and calculate and/or modify the confidence level that the selected chat bot is appropriately handling the chat communication session. For example, the chat automation server 140 may monitor the language received from the end user 106 and detect language indicating whether or not the chat automation server 140 is providing satisfactory answers to questions asked by the end user 106. The chat automation server 140 may also monitor the language received from the end user 106 to detect whether or not the end user 106 is satisfied, frustrated, confused, or is understanding the output from the chat automation server 140.

When the chat automation server 140 determines that the end user 106 is confused, frustrated, or unhappy, depending on the nature of the input from the end user 106, the chat automation server 140 may reduce the confidence level that it is properly handling the chat communication.

At operation 416, the chat automation server 140 determines whether or not the confidence level falls below a threshold level (e.g., a predetermined threshold level).

In response to determining that the confidence level is below the threshold level, the chat automation server 140 may proceed, at operation 418, to route the communication to a new or different communication path, a new or different chat automation profile, or a live agent.

For example, in some instances, the chat automation server 140 may determine, for example, based on input received from the end user 106, that the initially-selected communication path was incorrect, and the chat automation server 140 should have selected a different communication path. Thus, the chat automation server 140 may determine that the cause of confusion or frustration on the part of the end user 106 is due to the incorrect communication path being traversed. In such instances, the chat automation server 140 may select a different communication path based on input received from the end user 106.

In other instances, the chat automation server 140 may determine that the chat automation profile that was initially selected does not correspond well to the particular end user 106. For example, the selected chat automation profile may be configured to utilize slang or diction that is typically spoken by younger people, but the end user 106 may be confused by or not understand certain phrases utilized by the chat automation profile. Accordingly, the chat automation server 140 may select a different chat automation profile to continue with the chat communication. As discussed above, according to some embodiments, multiple chat bots may be silently (from the perspective of the end user) executing concurrently with an active chat bot communicating with the end user, which may facilitate an easier transition to a new chat bot profile.

In some instances, the chat automation server 140 may get stuck or may not understand the cause of the confusion or frustration on the part of the end user 106, and may not be able to determine whether or not a different communication path (or which different communication path) or a different chat automation profile should be selected. In such cases, the chat automation server 140 may route the chat communication to a live agent to continue with the chat communication session, if a live agent is available. According to some embodiments, the chat automation server 140 may route the chat communication to a live agent that has a corresponding (e.g., the same or similar) profile as the chat bot profile selected to handle the automated chat communication. Accordingly, the customer may be unaware of the transition from an automated chat communication to a communication with a live human agent, and the transfer may be relatively seamless or transparent to the customer.

If an agent is not available, the chat automation server 140 may make an effort to drag on or extend the automated chat communication until a suitable live agent becomes available. For example, the chat automation server 140 may ask one or more questions, for example to clarify the nature of the frustration or confusion of the end user 106, while the chat automation server 140 waits for a suitable live agent to become available.

Additionally, as discussed above with respect to FIGS. 3A-3C, the chat automation server 140 may provide information about the status of the chat communication to a live agent monitoring one or more automated chat sessions, and receive input from the live agent regarding how to appropriately redirect the chat communication session. For example, contextual information (e.g., input received from the end user 106 during the present communication session or past communication sessions, the current step or stage in the present communication session, profile information about the end user 106, etc.) may be displayed by way of the agent interface 170 on an agent device 130. Based on the contextual information, the live agent may be enabled to identify a different communication path that should be followed, or a different chat automation profile that should be utilized, and redirect the chat automation server 140 accordingly. Thus, the live agent may be able to enable the chat automation server 140 to continue handling the communication session without the communication session being escalated to a live agent.

After routing the chat communication to a new conversation path, a new chat automation profile, or a live agent, the chat automation server 140 may return to operation 414 to monitor the conversation and calculate or modify the confidence level that the chat automation server 140 is properly handling the communication session.

Returning to operation 416, if the confidence level stays at or above a threshold level (e.g., a predetermined threshold level), the chat automation server 140 may proceed to operation 420 to determine whether or not the conversation is completed. For example, the chat automation server 140 may detect certain phrases or input from the end user 106 indicating the end user 106 wishes to end the communication session. If, at operation 420, the chat automation server 140 determines the conversation (or topic/path) is not yet completed, the chat automation server 140 may return to operation 414 to monitor the conversation and calculate or modify the confidence level that the chat automation server 140 is properly handling the communication session. On the other hand, if the chat automation server 140 determines the conversation (or topic/path) is completed, the chat communication system 100 may terminate the communication session and/or not proceed with any further chat communications with the end user 106. Alternatively, the chat communication system 100 may inquire whether or not the end user 106 wishes to address any other issues (e.g., proceed down a different communication path), and if so, return to the beginning of the process illustrated in FIG. 4.

According to one or more embodiments of the present invention, various operations described above may be omitted, or additional operations may be included, unless otherwise indicated, without departing from the spirit and scope of the present invention. Additionally, the order of the operations may be modified or changed, unless otherwise stated or implied, without departing from the spirit and scope of the present invention.

Figure 5:
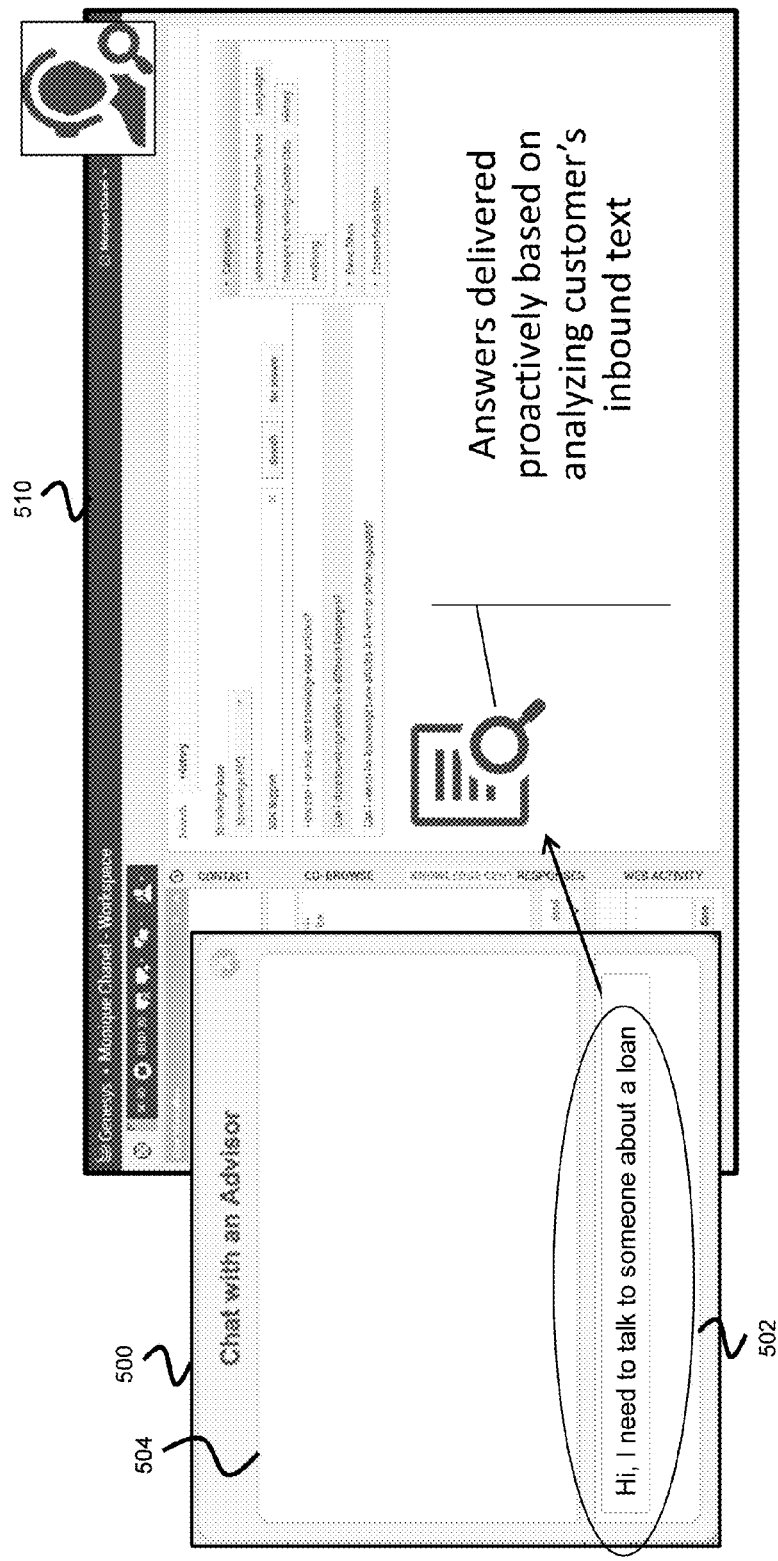
FIG. 5 illustrates a process of facilitating a chat communication according to some example embodiments of the present invention.

FIG. 5 illustrates a process of facilitating a chat communication according to some example embodiments of the present invention.

As shown in FIG. 5, a chat communication interface 500 may displayed on a display of an end user device 108 operated by an end user 106. The chat communication interface 500 may include either the actual chat, or may also be wrapped, for example, by a voice layer that is converted into chat through active speech recognition (ASR). In such instances, the returned chat response may be converted into voice through a text-to-speech (TTS) conversion process.

The chat communication interface 500 may include an input field 502, into which the end user 106 may enter or type text. The chat communication interface 500 may further include a communication summary or transcript field 504, for displaying the text from the end user 106 and the chat automation server 140. The information displayed on the chat communication interface 500 may be facilitated, for example, by the end user interface 160 shown in FIG. 2, which may be configured to send signals to the end user device 108 to populate the chat communication interface 500.

Additionally, as shown in FIG. 5, a chat communication interface 510 may be displayed on a display of an agent device 130. According to some embodiments of the present invention chat automation server 140 may perform text analytics on the input received from the end user 106 by way of the chat communication interface 500 in order to proactively deliver answers or responses to the text received from the end user 106. For example, the chat automation server 140 may detect, for example, that the end user 106 wishes to inquire about a product or service offered for sale by the business 104, by analyzing the text entered into the input field 502. In response, the chat automation server 140 may follow a corresponding conversation path as discussed above with respect to FIGS. 3A-3C and 4, to resolve the interests of the end user 106.

Additionally, as discussed above, an agent monitoring an automated chat communication may be enabled, by way of the chat communication interface 510, to redirect the chat automation server 140 to a different conversation path or topic, a different automated chat profile, or take over the chat communication manually, depending on whether or not the chat communication is being handled effectively.

Additionally, based on the input received by the end user 106, in some instances, the chat automation server 140 may identify one or more opportunities to provide upsell offers to the end user 106. For example, the end user 106 may express interest in one product or service, and the chat automation server 140 may identify another related product or service and deliver a message to the end user 106 explaining the related product or service and offering it for sale.

According to some embodiments, the chat automation server 140 may perform text analytics on the input received from the end user 106 and automatically generate a query that is transmitted to the knowledge management server 150 and/or the knowledge system 152. Based on the results of the query to the knowledge management server 150, the chat automation server 140 may provide an answer to the end user 106 by way of the chat communication interface 510, for example, including the response from the knowledge management server 150, or a hyperlink to an Internet website that is relevant to the input received from the end user 106.

The chat automation server 140 may also make suggestions regarding which portions of the interaction may be utilized to author content, for example, for use in subsequent interactions. For example, according to some embodiments, the chat automation server 140 may identify a question or a category of questions that are recurring or are commonly asked by customers, and may flag the question or category of questions for authoring instructional material to provide to future end users engaging in chat communication sessions. Then, when a subsequent user asks a similar question, the chat automation server 140 may direct the subsequent user to an Internet webpage, article, or explanation to help the user with his or her concern or problem.

In one embodiment, each of the various servers, controllers, switches, gateways, engines, and/or modules (collectively referred to as servers) in the afore-described figures are implemented via hardware or firmware (e.g. ASIC) as will be appreciated by a person of skill in the art.

In one embodiment, each of the various servers, controllers, switches, gateways, engines, and/or modules (collectively referred to as servers) in the afore-described figures is a process or thread, running on one or more processors, in one or more computing devices 1500 (e.g., FIG. 6A, FIG. 6B), executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments of the present invention, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JavaScript Object notation (JSON).

Figure 6A:
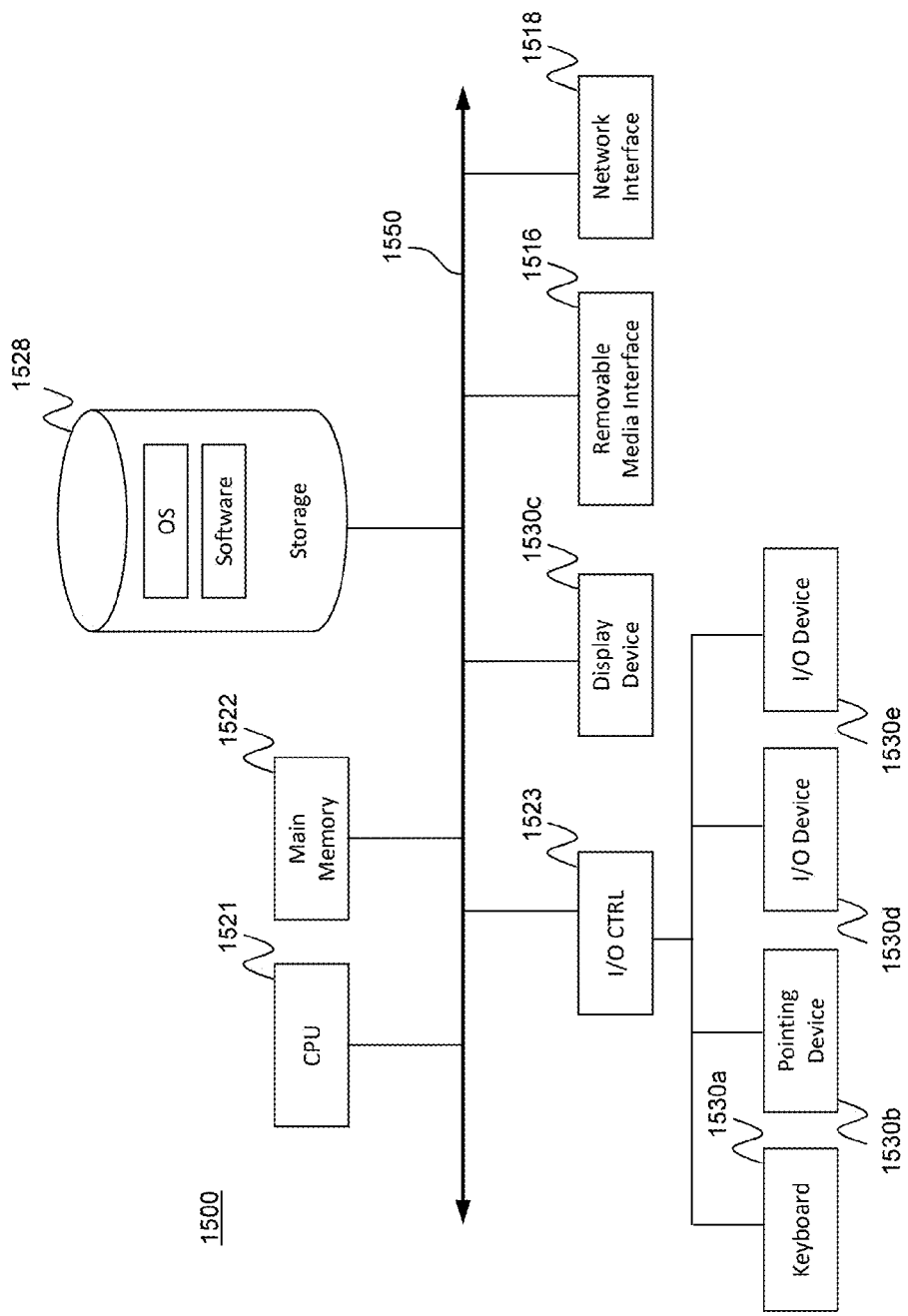
FIG. 6A is a block diagram of a computing device according to an embodiment of the present invention.
Figure 6B:
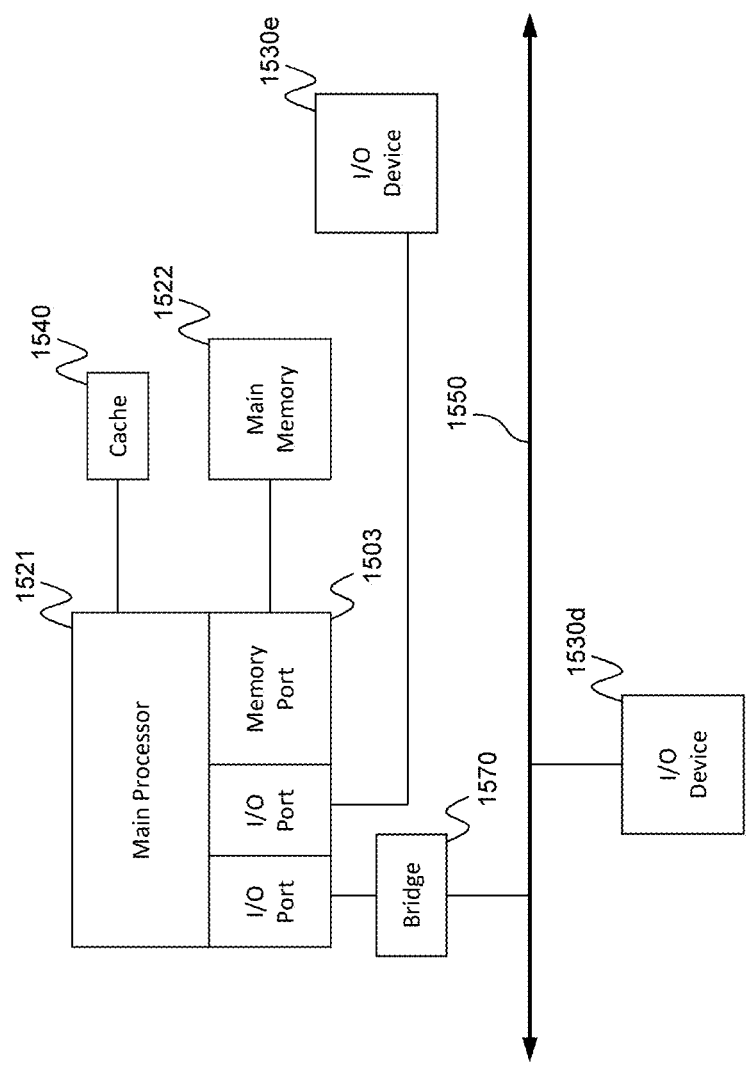
FIG. 6B is a block diagram of a computing device according to an embodiment of the present invention.

FIG. 6A and FIG. 6B depict block diagrams of a computing device 1500 as may be employed in exemplary embodiments of the present invention. Each computing device 1500 includes a central processing unit 1521 and a main memory unit 1522. As shown in FIG. 6A, the computing device 1500 may also include a storage device 1528, a removable media interface 1516, a network interface 1518, an input/output (I/O) controller 1523, one or more display devices 1530c, a keyboard 1530a and a pointing device 1530b, such as a mouse. The storage device 1528 may include, without limitation, storage for an operating system and software. As shown in FIG. 6B, each computing device 1500 may also include additional optional elements, such as a memory port 1503, a bridge 1570, one or more additional input/output devices 1530d, 1530e and a cache memory 1540 in communication with the central processing unit 1521. The input/output devices 1530a, 1530b, 1530d, and 1530e may collectively be referred to herein using reference numeral 1530.

The central processing unit 1521 is any logic circuitry that responds to and processes instructions fetched from the main memory unit 1522. It may be implemented, for example, in an integrated circuit, in the form of a microprocessor, microcontroller, or graphics processing unit (GPU), or in a field-programmable gate array (FPGA) or application-specific integrated circuit (ASIC). The main memory unit 1522 may be one or more memory chips capable of storing data and allowing any storage location to be directly accessed by the central processing unit 1521. As shown in FIG. 6A, the central processing unit 1521 communicates with the main memory 1522 via a system bus 1550. As shown in FIG. 6B, the central processing unit 1521 may also communicate directly with the main memory 1522 via a memory port 1503.

FIG. 6B depicts an embodiment in which the central processing unit 1521 communicates directly with cache memory 1540 via a secondary bus, sometimes referred to as a backside bus. In other embodiments, the central processing unit 1521 communicates with the cache memory 1540 using the system bus 1550. The cache memory 1540 typically has a faster response time than main memory 1522. As shown in FIG. 6A, the central processing unit 1521 communicates with various I/O devices 1530 via the local system bus 1550. Various buses may be used as the local system bus 1550, including a Video Electronics Standards Association (VESA) Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 1530c, the central processing unit 1521 may communicate with the display device 1530c through an Advanced Graphics Port (AGP). FIG. 6B depicts an embodiment of a computer 1500 in which the central processing unit 1521 communicates directly with I/O device 1530e. FIG. 6B also depicts an embodiment in which local busses and direct communication are mixed: the central processing unit 1521 communicates with I/O device 1530d using a local system bus 1550 while communicating with I/O device 1530e directly.

A wide variety of I/O devices 1530 may be present in the computing device 1500. Input devices include one or more keyboards 1530a, mice, trackpads, trackballs, microphones, and drawing tablets. Output devices include video display devices 1530c, speakers, and printers. An I/O controller 1523, as shown in FIG. 6A, may control the I/O devices. The I/O controller may control one or more I/O devices such as a keyboard 1530a and a pointing device 1530b, e.g., a mouse or optical pen.

Referring again to FIG. 6A, the computing device 1500 may support one or more removable media interfaces 1516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 1530 may be a bridge between the system bus 1550 and a removable media interface 1516.

The removable media interface 1516 may for example be used for installing software and programs. The computing device 1500 may further comprise a storage device 1528, such as one or more hard disk drives or hard disk drive arrays, for storing an operating system and other related software, and for storing application software programs. Optionally, a removable media interface 1516 may also be used as the storage device. For example, the operating system and the software may be run from a bootable medium, for example, a bootable CD.

In some embodiments, the computing device 1500 may comprise or be connected to multiple display devices 1530c, which each may be of the same or different type and/or form. As such, any of the I/O devices 1530 and/or the I/O controller 1523 may comprise any type and/or form of suitable hardware, software, or combination of hardware and software to support, enable or provide for the connection to, and use of, multiple display devices 1530c by the computing device 1500. For example, the computing device 1500 may include any type and/or form of video adapter, video card, driver, and/or library to interface, communicate, connect or otherwise use the display devices 1530c. In one embodiment, a video adapter may comprise multiple connectors to interface to multiple display devices 1530c. In other embodiments, the computing device 1500 may include multiple video adapters, with each video adapter connected to one or more of the display devices 1530c. In some embodiments, any portion of the operating system of the computing device 1500 may be configured for using multiple display devices 1530c. In other embodiments, one or more of the display devices 1530c may be provided by one or more other computing devices, connected, for example, to the computing device 1500 via a network. These embodiments may include any type of software designed and constructed to use the display device of another computing device as a second display device 1530c for the computing device 1500. One of ordinary skill in the art will recognize and appreciate the various ways and embodiments that a computing device 1500 may be configured to have multiple display devices 1530c.

A computing device 1500 of the sort depicted in FIG. 6A and FIG. 6B may operate under the control of an operating system, which controls scheduling of tasks and access to system resources. The computing device 1500 may be running any operating system, any embedded operating system, any real-time operating system, any open source operating system, any proprietary operating system, any operating systems for mobile computing devices, or any other operating system capable of running on the computing device and performing the operations described herein.

The computing device 1500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1500 may have different processors, operating systems, and input devices consistent with the device.

In other embodiments the computing device 1500 is a mobile device, such as a Java-enabled cellular telephone or personal digital assistant (PDA), a smart phone, a digital audio player, or a portable media player. In some embodiments, the computing device 1500 comprises a combination of devices, such as a mobile phone combined with a digital audio player or portable media player.

As shown in FIG. 6C, the central processing unit 1521 may comprise multiple processors P1, P2, P3, P4, and may provide functionality for simultaneous execution of instructions or for simultaneous execution of one instruction on more than one piece of data. In some embodiments, the computing device 1500 may comprise a parallel processor with one or more cores. In one of these embodiments, the computing device 1500 is a shared memory parallel device, with multiple processors and/or multiple processor cores, accessing all available memory as a single global address space. In another of these embodiments, the computing device 1500 is a distributed memory parallel device with multiple processors each accessing local memory only. In still another of these embodiments, the computing device 1500 has both some memory which is shared and some memory which may only be accessed by particular processors or subsets of processors. In still even another of these embodiments, the central processing unit 1521 comprises a multicore microprocessor, which combines two or more independent processors into a single package, e.g., into a single integrated circuit (IC). In one exemplary embodiment, depicted in FIG. 6D, the computing device 1500 includes at least one central processing unit 1521 and at least one graphics processing unit 1521'.

In some embodiments, a central processing unit 1521 provides single instruction, multiple data (SIMD) functionality, e.g., execution of a single instruction simultaneously on multiple pieces of data. In other embodiments, several processors in the central processing unit 1521 may provide functionality for execution of multiple instructions simultaneously on multiple pieces of data (MIMD). In still other embodiments, the central processing unit 1521 may use any combination of SIMD and MIMD cores in a single device.

Figure 6E:
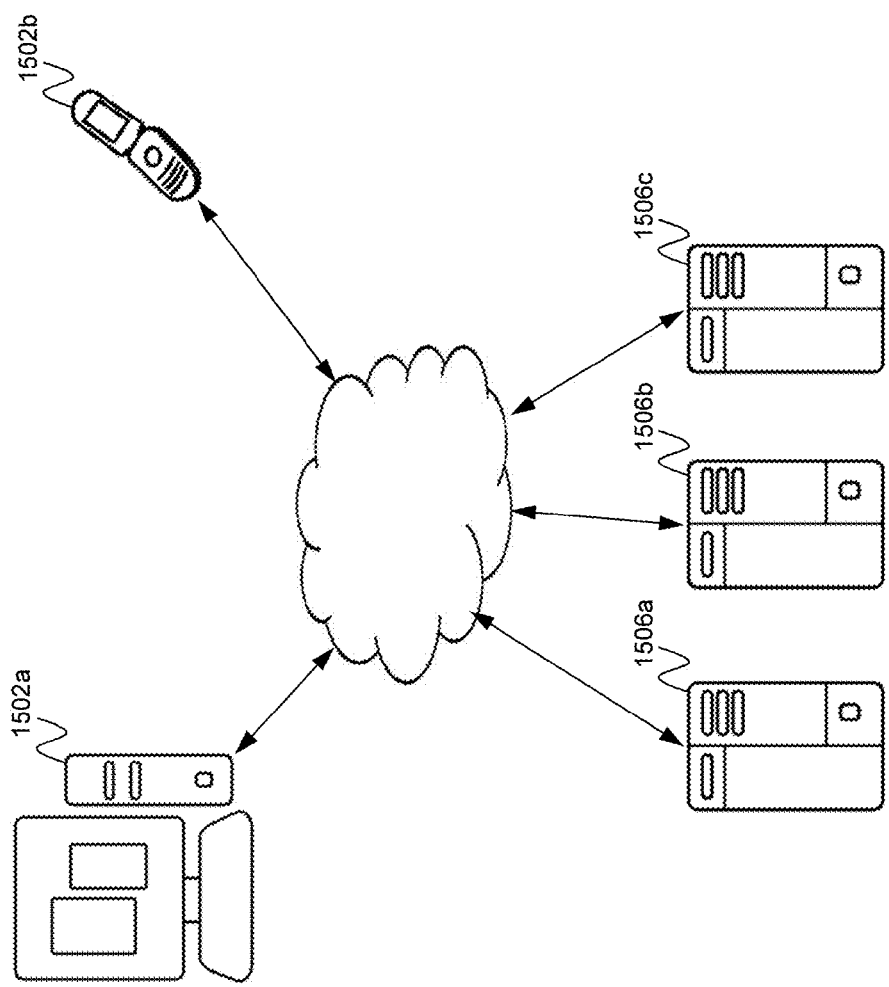
FIG. 6E is a block diagram of a network environment including several computing devices according to an embodiment of the present invention.

A computing device may be one of a plurality of machines connected by a network, or it may comprise a plurality of machines so connected. FIG. 6E shows an exemplary network environment. The network environment comprises one or more local machines 1502a, 1502b (also generally referred to as local machine(s) 1502, client(s) 1502, client node(s) 1502, client machine(s) 1502, client computer(s) 1502, client device(s) 1502, endpoint(s) 1502, or endpoint node(s) 1502) in communication with one or more remote machines 1506a, 1506b, 1506c (also generally referred to as server machine(s) 1506 or remote machine(s) 1506) via one or more networks 1504. In some embodiments, a local machine 1502 has the capacity to function as both a client node seeking access to resources provided by a server machine and as a server machine providing access to hosted resources for other clients 1502a, 1502b. Although only two clients 1502 and three server machines 1506 are illustrated in FIG. 6E, there may, in general, be an arbitrary number of each. The network 1504 may be a local-area network (LAN), e.g., a private network such as a company Intranet, a metropolitan area network (MAN), or a wide area network (WAN), such as the Internet, or another public network, or a combination thereof.

The computing device 1500 may include a network interface 1518 to interface to the network 1504 through a variety of connections including, but not limited to, standard telephone lines, local-area network (LAN), or wide area network (WAN) links, broadband connections, wireless connections, or a combination of any or all of the above. Connections may be established using a variety of communication protocols. In one embodiment, the computing device 1500 communicates with other computing devices 1500 via any type and/or form of gateway or tunneling protocol such as Secure Socket Layer (SSL) or Transport Layer Security (TLS). The network interface 1518 may comprise a built-in network adapter, such as a network interface card, suitable for interfacing the computing device 1500 to any type of network capable of communication and performing the operations described herein. An I/O device 1530 may be a bridge between the system bus 1550 and an external communication bus.

According to one embodiment, the network environment of FIG. 6E may be a virtual network environment where the various components of the network are virtualized. For example, the various machines 1502 may be virtual machines implemented as a software-based computer running on a physical machine. The virtual machines may share the same operating system. In other embodiments, different operating system may be run on each virtual machine instance. According to one embodiment, a "hypervisor" type of virtualization is implemented where multiple virtual machines run on the same host physical machine, each acting as if it has its own dedicated box. Of course, the virtual machines may also run on different host physical machines.

Other types of virtualization is also contemplated, such as, for example, the network (e.g. via Software Defined Networking (SDN)). Functions, such as functions of the session border controller and other types of functions, may also be virtualized, such as, for example, via Network Functions Virtualization (NFV).

Although this invention has been described in certain specific embodiments, those skilled in the art will have no difficulty devising variations to the described embodiment, which in no way depart from the scope and spirit of the present invention. Furthermore, to those skilled in the various arts, the invention itself herein will suggest solutions to other tasks and adaptations for other applications. It is the applicant's intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents rather than the foregoing description.

What is claimed is:

1. A method for managing chat automation, the method comprising:
   receiving, by a processor, a signal indicating a communication is being initiated by an end user operating an end user device;
   receiving, by the processor, information from the end user device regarding the communication;
   selecting, by the processor, a first automated conversation path having a plurality of conversations stages based on the information regarding the communication;
   invoking, by the processor, a chat automation server to configure an automated chat resource for engaging in a chat communication session with the end user device, wherein the automated chat resource is configured to follow the first automated conversation path during the chat communication session;
   monitoring, by the processor, confidence levels of automated chat responses during the chat communication session; and
   redirecting, by the processor, the chat communication session to a second automated conversation path in response to at least one of the confidence levels falling below a threshold level based on input received from the end user device during the communication, wherein the automated chat resource is configured to follow the second automated conversation path during the chat communication session.

2. The method of claim 1, further comprising traversing, by the processor, the second automated conversation path.

3. The method of claim 1, further comprising:
   transmitting, by the processor, an instruction to display a proposed response on an agent device corresponding to a contact center agent.

4. The method of claim 3, further comprising receiving, by the processor, a modification to the proposed response from the agent device.

5. The method of claim 4, further comprising transmitting, by the processor, an instruction to display the proposed response with the modification to the end user device.

6. The method of claim 1, further comprising transmitting, by the processor, a signal to route the chat communication session to a live agent in response to the confidence levels being below a threshold level.

7. The method of claim 1, further comprising transmitting, by the processor, an instruction to display a graphical representation of the first automated conversation path on an agent device corresponding to a contact center agent.

8. The method of claim 7, further comprising receiving, by the processor, a selection of the second automated conversation path from the agent device.

9. The method of claim 1, wherein the first automated conversation path is a provided by a script.

10. The method of claim 1, wherein the automated chat responses are based on history and state of the chat communication session.

11. The method of claim 1, wherein the confidence levels are determined based on feedback from the end user device.

12. A system for managing chat automation, the system comprising:
   a processor; and
   a memory coupled to the processor, wherein the memory stores instructions that, when executed by the processor, cause the processor to:
      receive a signal indicating a communication is being initiated by an end user operating an end user device;
      receive information from the end user device regarding the communication;
      select a first automated conversation path having a plurality of conversation stages based on the information regarding the communication;
      invoke a chat automation server to configure an automated chat resource for engaging in a chat communication session with the end user device, wherein the automated chat resource is configured to follow the first automated conversation path during the chat communication session;
      monitor confidence levels of automated chat responses during the chat communication session; and
      redirect the chat communication session to a second automated conversation path in response to at least one of the confidence levels falling below a threshold level based on input received from the end user device during the communication, wherein the automated chat resource is configured to follow the second automated conversation path during the chat communication session.

13. The system of claim 12, wherein the instructions further cause the processor to traverse the second automated conversation path.

14. The system of claim 12, further comprising:
   wherein the instructions further cause the processor to transmit an instruction to display a proposed response on an agent device corresponding to a contact center agent.

15. The system of claim 14, wherein the instructions further cause the processor to receive a modification to the proposed response from the agent device.

16. The system of claim 15, wherein the instructions further cause the processor to transmit an instruction to display the proposed response with the modification to the end user device.

17. The system of claim 12, wherein the instructions further cause the processor to transmit a signal to route the chat communication session to a live agent in response to the confidence levels being below a threshold level.

18. The system of claim 12, wherein the instructions further cause the processor to transmit an instruction to display a graphical representation of the first automated conversation path on an agent device corresponding to a contact center agent.

19. The system of claim 18, wherein the instructions further cause the processor to receive a selection of the second automated conversation path from the agent device.

20. The system of claim 12, wherein the confidence levels are determined based on feedback from the end user device.

* * * * *